US012786836B2

(12) United States Patent
Xiong

(10) Patent No.: US 12,786,836 B2
(45) Date of Patent: Nov. 3, 2026

(54) RADIO LINK FAILURE DETECTION METHOD AND APPARATUS, AND STORAGE MEDIUM

(71) Applicant: Beijing Xiaomi Mobile Software Co., Ltd., Beijing (CN)

(72) Inventor: Yi Xiong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 322 days.

(21) Appl. No.: 18/692,049

(22) PCT Filed: Sep. 15, 2021

(86) PCT No.: PCT/CN2021/118573
§ 371 (c)(1),
(2) Date: Mar. 14, 2024

(87) PCT Pub. No.: WO2023/039760
PCT Pub. Date: Mar. 23, 2023

(65) Prior Publication Data
US 2024/0397403 A1 Nov. 28, 2024

(51) Int. Cl.
*H04W 4/00* (2018.01)
*H04W 24/04* (2009.01)
*H04W 36/30* (2009.01)
*H04W 64/00* (2009.01)

(52) U.S. Cl.
CPC ......... *H04W 36/305* (2018.08); *H04W 24/04* (2013.01); *H04W 64/00* (2013.01)

(58) Field of Classification Search
CPC ............................ H04W 36/305; H04W 64/00
See application file for complete search history.

(56) References Cited

U.S. PATENT DOCUMENTS

| | | | | |
|---|---|---|---|---|
| 9,961,709 | B2 * | 5/2018 | Chang | H04W 76/27 |
| 2015/0271763 | A1 | 9/2015 | Balachandran et al. | |
| 2016/0014646 | A1 | 1/2016 | Yiu et al. | |
| 2018/0124687 | A1 * | 5/2018 | Park | H04L 5/1469 |
| 2019/0052377 | A1 * | 2/2019 | Hwang | H04B 17/309 |
| 2021/0258909 | A1 | 8/2021 | Rydén et al. | |
| 2021/0321306 | A1 * | 10/2021 | Bin Redhwan | H04W 36/0058 |

(Continued)

FOREIGN PATENT DOCUMENTS

| | | | |
|---|---|---|---|
| CN | 103974452 | A | 8/2014 |
| CN | 105144774 | A | 12/2015 |

(Continued)

OTHER PUBLICATIONS

International Searching Authority, English Translation of the Written Opinion of the International Searching Authority, WIPO, May 30, 2022, pp. 1-4. (Year: 2022).*

(Continued)

*Primary Examiner* — Elisabeth Benoit Magloire
(74) *Attorney, Agent, or Firm* — Volpe Koenig

(57) ABSTRACT

A Radio Link Failure (RLF) detection method is executed by a terminal and includes: determining configuration information related to RLF detection, and determining location information of the terminal; and starting a first timer based on at least one of the configuration information or the location information of the terminal, the first timer being used for the RLF detection.

12 Claims, 5 Drawing Sheets

(56) References Cited

U.S. PATENT DOCUMENTS

| | | | | |
|---|---|---|---|---|
| 2021/0377771 | A1* | 12/2021 | Wu | H04J 11/0023 |
| 2023/0054925 | A1* | 2/2023 | Vivanco | H04W 76/19 |
| 2024/0205754 | A1* | 6/2024 | Kumar | H04W 36/0079 |
| 2024/0205763 | A1* | 6/2024 | Yan | H04W 36/08 |

FOREIGN PATENT DOCUMENTS

| | | | |
|---|---|---|---|
| CN | 112313987 | A | 2/2021 |
| CN | 112910615 | A | 6/2021 |
| EP | 2613586 | A1 | 7/2013 |

OTHER PUBLICATIONS

Huawei et al. “Discussion on Mobility Enhancement for IoT NTN”, 3GPP TSG RAN WG2 #114-e R2-2105663, May 10, 2021.

* cited by examiner

RADIO LINK FAILURE DETECTION METHOD AND APPARATUS, AND STORAGE MEDIUM

CROSS-REFERENCE TO RELATED APPLICATIONS

The present application is a U.S. National Stage of International Application No. PCT/CN2021/118573, filed on Sep. 15, 2021, the contents of all of which are incorporated herein by reference in their entireties for all purposes.

BACKGROUND OF THE INVENTION

The new generation of communication technology involves a non-terrestrial networks (NTN) system and the Internet of Things (IoT). Terminals under NTN and IoT NTN may trigger a radio resource control (RRC) reestablishment process through a radio link failure (RLF), enabling the terminals under NTN and IoT NTN to access the network.

SUMMARY OF THE INVENTION

According to a first aspect of an example of the disclosure, an RLF detection method is provided. The method is executed by a terminal and includes:

determining configuration information related to RLF detection, and determining location information of the terminal; and starting a first timer based on the configuration information and/or the location information of the terminal, the first timer being used for the RLF detection.

According to a second aspect of an example of the disclosure, a radio link failure (RLF) detection method is provided. The method is executed by a network device and includes:

determining configuration information related to RLF detection; and sending the configuration information, the configuration information being used for the RLF detection.

According to a third aspect of an example of the disclosure, an RLF detection apparatus is provided, and includes:

a processor; and a memory, configured to store instructions executable by the processor; where, the processor is configured to: execute the RLF detection method described in the first aspect or any implementation in the first aspect, or execute the RLF detection method described in the second aspect or any implementation in the second aspect.

According to a fourth aspect of an example of the disclosure, a computer storage medium is provided for storing instructions. The instructions, when executed, implement the method described in the first aspect or any implementation in the first aspect.

According to a fifth aspect of an example of the disclosure, a computer storage medium is provided for storing instructions. The instructions, when executed, implement the method described in the second aspect or any implementation in the second aspect.

It needs to be understood that the above general description and the following detailed description are merely for example and explanatory, and cannot limit the disclosure.

BRIEF DESCRIPTION OF DRAWINGS

Accompanying drawings here, which are incorporated in and constitute a part of this specification, illustrate examples consistent with the disclosure and together with the specification, serve to explain the principles of the disclosure.

DETAILED DESCRIPTION OF THE INVENTION

Examples will be illustrated in detail here, and instances of which are represented in accompanying drawings. When the following description refers to the accompanying drawings, the same number in the different accompanying drawings represents the same or similar elements unless otherwise indicated. The implementations described in the following examples do not represent all implementations consistent with the disclosure. On the contrary, they are merely examples of an apparatus and method consistent with some aspects of the disclosure as detailed in the appended claims.

The disclosure relates to the technical field of wireless communications, in particular to a radio link failure detection method and apparatus, and a storage medium.

The RLF may be triggered by a set timer, and the timer is configured to determine whether a channel quality can be recovered within a certain period of time, so as to reduce the number of triggering times of the RLF. In the NTN and IoT NTN systems, if a signal intensity is low due to the terminal being at an edge of a satellite cell, the probability of channel quality recovery is low. In this case, a configured timer duration needs to be relatively small. If the signal intensity is low due to the fact that a signal of the terminal in the satellite cell is blocked, the probability of channel quality recovery is high. In this case, the configured timer duration needs to be relatively large. In the related art, the timer cannot be configured with appropriate timer durations for both the low signal intensity caused by the terminal being at the edge of the satellite cell and the low signal intensity caused by the signal of the terminal in the satellite cell being blocked. If the configured timer duration is not appropriate, it will delay link recovery or increase unnecessary RLF and RRC reestablishment.

In order to overcome the problem existing in the related art, the disclosure provides a radio link failure detection method and apparatus, and a storage medium.

Figure 1:
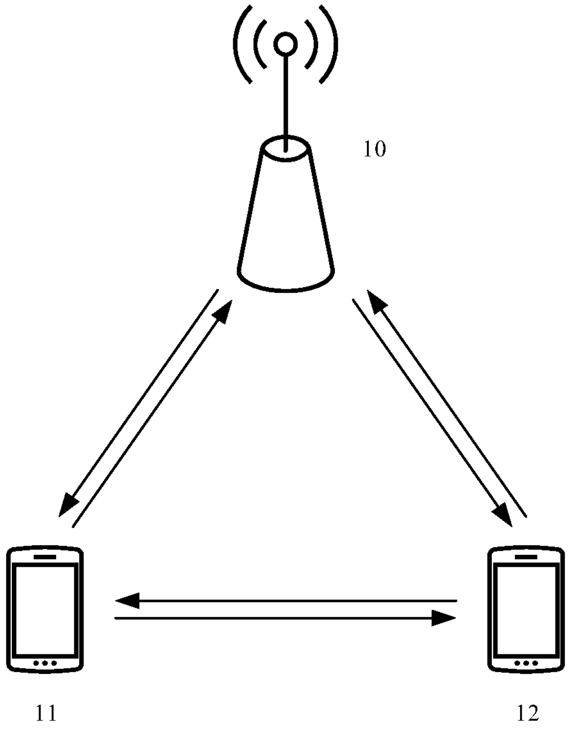
FIG. 1 is an architecture diagram of a communication system of a network device and a terminal shown according to an example.

FIG. 1 is an architecture diagram of a communication system of a network device 10 and terminals 11, 12 shown according to an example. A communication method provided by the disclosure may be applied to the architecture diagram of the communication system shown in FIG. 1. As shown in FIG. 1, a network side device may send signaling based on an architecture shown in FIG. 1.

It may be understood that the communication system of the network device and the terminal shown in FIG. 1 is merely a schematic illustration, and the wireless communication system may further include other network devices, for example, it may further include a core network device, a wireless relay device, a wireless backhaul device, etc., which is not drawn in FIG. 1. The example of the disclosure does not limit the quantity of the network devices and the quantity of the terminals included in the wireless communication system.

It may be further understood that the wireless communication system in the example of the disclosure is a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. A network may be divided into a 2G (generation) network, a 3G network, a 4G network or a future evolution network, such as a 5G network, according to capacity, speed, delay and other factors of the different networks. The 5G network may also be called a new radio (NR) network. For convenience of description, the disclosure sometimes may refer to the wireless communication network simply as the network.

Further, the network device involved in the disclosure may also be called a radio access network device. The radio access network device may be: a base station, an evolved node B (base station), a femto, an access point (AP) in a wireless fidelity (WIFI) system, a wireless relay node, a wireless backhaul node, a transmission point (TP) or a transmission and reception point (TRP), etc., may further be a gNB in an NR system, or may further be a component or part of a device that constitutes a base station. In response to determining that it is a vehicle-to-everything (V2X) communication system, the network device may further be a vehicle-mounted device. It needs to be understood that a specific technology and a specific device form employed by the network device are not limited in the example of the disclosure.

Further, the terminal involved in the disclosure may also be call a terminal device, user equipment (UE), a mobile station (MS), a mobile terminal (MT), etc., and is a device that provides voice and/or data connectivity to a user. For example, the terminal may be a handheld device and a vehicle-mounted device with a wireless connection function. At present, some examples of the terminal are: a mobile phone, a pocket personal computer (PPC), a palm computer, a personal digital assistant (PDA), a notebook computer, a tablet computer, a wearable device, or the vehicle-mounted device, etc. In addition, in response to determining that it is the vehicle-to-everything (V2X) communication system, the terminal may further be the vehicle-mounted device. It needs to be understood that the specific technology and the specific device form employed by the terminal are not limited in the example of the disclosure.

In the new generation of communication system, such as a 5G new radio (NR) system, non-terrestrial networks (NTN), namely a 5G satellite communication network, is introduced. In the 5G satellite communication network, due to movement of asynchronous satellites, a service time of each satellite to the terminal is limited, and the terminal will perform handover and cell reselection after a period of time. The service time of the satellite to the terminal may be determined by an orbit altitude of the satellite, different cell coverage radii, and a moving speed of the terminal. The orbit altitude of an LEO satellite is generally about 600 km.

A non-geostationary earth orbiting (Non-GEO) satellite in the NTN move at a high speed relative to a fixed location on Earth, resulting in frequent and inevitable handover between a stationary terminal and a mobile terminal. Frequent cell handover can lead to an increase in signaling overhead and potentially exacerbate other mobility-related potential issues, such as service interruptions caused by signaling delay.

For a terminal moving at a constant speed and direction, a maximum time where the terminal can maintain a connection to the satellite cell is approximately to divide a cell diameter by a movement speed of UE relative to the satellite cell. For a low earth orbiting (LEO) system, a cell size is divided by a relative speed between the UE and the satellite cell. When the UE moves in the same direction as the satellite, the relative speed is a satellite speed plus an opposite value of a UE speed. When the UE moves in the same direction as the satellite, the relative speed is the satellite speed plus the UE speed, which may be described by the following equation:

Time to HO=cell size (km)/(terminal speed (km/hr) *(1 hr/3600 s)+satellite speed (km/s))

Table 1 shows a maximum time that the terminal may be connected to a cell, calculated based on the above equation in a case that the cell diameter is 50 km and 1000 km.

TABLE 1

Time to HO for min/max cell diameter and varying UE speeds

| Cell Diameter Size (km) | UE Speed (km/hr) | Satellite Speed (km/s) | Time to HO (s) |
|---|---|---|---|
| 50 (lower bound) | +500 | 7.56 | 6.49 |
| | −500 | | 6.74 |
| | +1200 | | 6.33 |
| | −1200 | | 6.92 |
| | Neglected | | 6.61 |
| 1000 (upper bound) | +500 | | 129.89 |
| | −500 | | 134.75 |
| | +1200 | | 126.69 |
| | −1200 | | 138.38 |
| | Neglected | | 132.28 |

It may be understood that each element in Table 1 exists independently, and these elements are illustratively listed in the same table, but it does not mean that all elements in the table need exist simultaneously as shown in the table. A value of each element is independent of any other element values in Table 1. Thus, those skilled in the art can understand that the value of each element in Table 1 is an independent example.

An IoT NTN system is involved in the new generation of communication technology. An IoT terminal under IoT NTN includes a narrow band Internet of Things (NB-IoT) terminal and an LTE enhanced MTO (eMTC) terminal. The eMTC terminal supports cell handover, while the NB-IoT terminal does not support cell handover. Instead, the NB-IoT terminal triggers an RRC reestablishment process through an RLF to achieve the conversion of the IoT NTN terminal access to the cell. At present, research on the IoT NTN is based on the fact that an IoT device has a positioning function.

In the related art, the process of detecting the RLF is as follows:

if any DAPS bearer is configured, merely a target primary cell (PCell) is considered below; when a timer T310 is at expiry, or when T312 is at expiry, or when T300, T301, T304 and T311 are not running, according to a random access problem indication from master cell group (MCG) MAC, or according to an indication from a MCG radio link control (RLC) protocol allowed to be sent on the PCell, signaling radio bearers (SRB) or data radio bearers (DRB) has reached the maximum number of retransmissions, considering the detection of the radio link failure in MCG, i.e., the detection of the RLF.

In the NB-IoT, it starts after receiving N310 consecutive out-of-sync indications and stops after receiving N311 consecutive in-sync. When T310 is at expiry, an RRC connection re-establishment procedure is triggered or the terminal switches to RRC-IDLE, as shown in Table 2.

TABLE 2

| Timer | Start | Stop | At expiry |
|---|---|---|---|
| T310 NOTE1 NOTE2 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure, upon initiating the connection re-establishment procedure, and upon initiating the MCG failure information procedure. | If security is not activated and the UE is not a NB-IoT UE that supports RRC connection re-establishment for the Control Plane CIoT EPS/5GS optimisation: go to RRC_IDLE else: initiate the MCG failure information procedure as specified or the connection re-establishment procedure as specified |

It may be understood that each element in Table 2 exists independently, and these elements are illustratively listed in the same table, but it does not mean that all elements in the table need exist simultaneously as shown in the table. A value of each element is independent of any other element values in Table 1. Thus, those skilled in the art can understand that the value of each element in Table 2 is an independent example.

TABLE 3

| Counter | Reset | Incremented | When reaching max value |
|---|---|---|---|
| N310 | Upon reception of "in-sync" indication from lower layers; upon receiving RRC Reconfiguration with reconfiguration With Sync for that cell group; upon initiating the connection re-establishment procedure. | Upon reception of "out-of-sync" from lower layer while the timer T310 is stopped. | Start timer T310 |
| N311 | Upon reception of "out-of-sync" indication from lower layers; upon receiving RRC Reconfiguration with reconfiguration With Sync for that cell group; upon initiating the connection re-establishment procedure | Upon reception of the "in-sync" from lower layer while the timer T310 is running. | Stop the timer T310 |

It may be understood that each element in Table 3 exists independently, and these elements are illustratively listed in the same table, but it does not mean that all elements in the table need to exist simultaneously as shown in the table. A value of each element is independent of any other element values in Table 3. Thus, those skilled in the art can understand that the value of each element in Table 3 is an independent example.

For the NB-IoT device, a value range of T310 is defined to include: 0 ms, 200 ms, 500 ms, 1000 ms, 2000 ms, 4000 ms, and 8000 ms. As shown in the above parameters, in the NB-IoT, it is determined that the RLF can reach up to 8 s based on T310 timeout in a current mechanism, but a maximum connection duration for the LEO cell with a diameter of 50 km is about 6 s.

The larger the T310 setting, the longer it takes for the UE to detect RL downlink out-of-step. During this time, relevant resources cannot be released timely, nor can recovery operations be initiated or a new resource establishment request be responded to, increasing the possibility of interruption. If T310 is set too small, the RLF will be triggered frequently.

For NB-IoT UE in the NTN system, RLF detection may be triggered by the set timer, and the timer is configured to wait for channel quality recovery. If it is located at an edge of the satellite cell and is about to lose coverage of the satellite cell, it needs to wait for timeout of the timer T310 to determine the radio link failure. However, in these scenarios, channel quality is difficult to recover. If T310 is set too large at this time, waiting for timeout of the timer will delay link recovery, increase interruptions, and also consume electricity during the RLF detection process, causing unnecessary power consumption of the IoT device. However, for UE within a coverage range of the NTN, if a signal intensity of the satellite cell is blocked, it needs to configure a suitable T310, so that the UE can have time to wait for channel quality recovery, thus avoiding unnecessary RLF. In the related art, the timer duration configured for the timer T310 cannot simultaneously meet the timer durations for RLF detection when the terminal is in different locations.

The disclosure provides an RLF triggering method. The RLF triggering method is applicable to a detection method of an RLF for an IoT NTN system, and certainly applicable to detection of other RLFs.

The RLF detection method provided by the disclosure introduces a new timer duration, selects different timer durations based on a location of a terminal relative to a satellite, and starts a timer according to its corresponding timer duration. For example, when the terminal is located at an edge of a satellite cell, a timer duration corresponding to a situation that the terminal is located at the edge of the satellite cell is selected, and the timer is started based on the timer duration to detect the RLF. The RLF is detected in a case of timeout of the timer. When the terminal is away from the edge of the cell, a timer duration corresponding to a situation that the terminal is away from the edge of the cell is selected, and the timer may be started according to the timer duration to detect the RLF.

The RLF detection method provided by the disclosure may further introduce a new timer, and the different timers correspond to different locations of the terminal relative to the satellite. The corresponding timer is started according to the location of the terminal relative to the satellite. For example, when the terminal is located at the edge of the satellite cell, the timer corresponding to the situation that the terminal is located at the edge of the satellite cell is selected, and the timer is started to detect the RLF. The RLF is detected in a case of timeout of the timer. When the terminal is away from the edge of the cell, a timer corresponding to the situation that the terminal is away from the edge of the cell is selected, and the timer is started to detect the RLF. The RLF is detected in a case of timeout of the timer. The timer may further be stopped on this basis.

The RLF detection method provided by the disclosure may further introduce a scaling factor, and uses the scaling factor to adjust the timer duration. When the location of the terminal relative to the satellite meets a selection condition, the scaling factor may be used to adjust the timer duration, and the RLF may be detected based on the adjusted timer duration.

Based on the multiple RLF detection methods provided by the disclosure, the UE located at the edge of the satellite cell can trigger the RLF at an appropriate time, RRC reestablishment can be reduced, or a network transmission environment can be ensured to be recovered in time, so that the terminal can quickly recover the connection with a network or enter an idle state.

The technical solution provided by the examples of the disclosure may include the following beneficial effects: through the disclosure, the start of first timer or the first timer duration is determined according to the location information of the terminal and/or the configuration information of the network device, for detecting the RLF, thus an appropriate time can be determined based on the location of the terminal, and the RLF can be detected within the time corresponding to the location of the terminal, which can reduce RRC reestablishment, or ensure that a network transmission environment can be recovered in time, so that the terminal can quickly recover the connection with the network or enter an idle state.

In the example of the disclosure, the terminal starts the timer for RLF detection based on its own location information and network configuration information. In the following implementations, the implementation that the terminal starts the timer for RLF detection based on its own location information and the network configuration information is illustrated below first.

Figure 2:
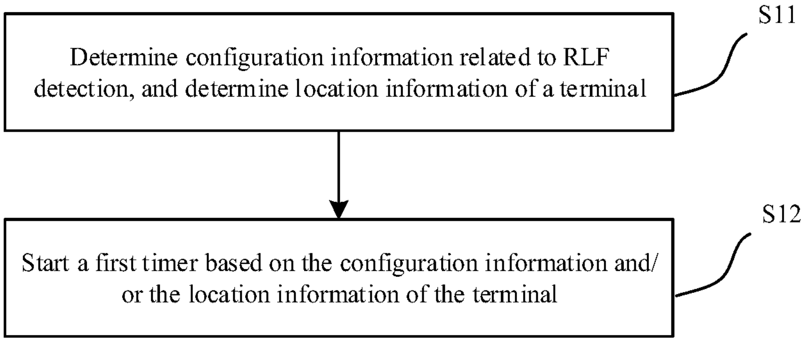
FIG. 2 is a flow diagram of an RLF detection method shown according to an example.

FIG. 2 is a flow diagram of an RLF detection method shown according to an example. As shown in FIG. 2, the RLF detection method is executed by a terminal and includes the following steps.

In step S11, configuration information related to RLF detection is determined, and location information of the terminal is determined.

In step S12, a first timer is started based on the configuration information and/or the location information of the terminal.

The first timer is used for RLF detection.

In the example of the disclosure, the terminal determines the configuration information related to the RLF detection and configured by a network device, or receives signaling sent by the network device, and determines the configuration information related to the RLF detection based on the signaling. The signaling may be a broadcast message, proprietary signaling or the like.

The terminal acquires the location information of the terminal according to its own global navigation satellite system (GNSS) capability. The location information of the terminal may further be determined according to the proprietary signaling of a network.

Further, the terminal determines to start the first timer according to the obtained configuration information related to the RLF detection and/or the location information of the terminal.

Through the RLF detection method provided by the example of the disclosure, the first timer for RLF detection is started based on a starting condition according to the location of the terminal, so that the corresponding first timer for RLF detection may be determined based on different locations of the terminal relative to the satellite, which can reduce RRC reestablishment, or ensure that a network transmission environment is recovered in time, so that the terminal can quickly recover the connection with the network or enter an idle state.

The starting condition included in the configuration information may be indicated by the network device or specified through a protocol, as mentioned above, which is not specifically limited here. It may be understood that if the starting condition is indicated by the network device to the terminal, the network device may dynamically indicate or reconfigure the starting condition according to the actual situation.

In the example of the disclosure, multiple ways to start the first timer are included.

If the terminal determines to start the first timer based on the configuration information and the location information of the terminal, the following implementations may be included.

In an implementation, the first timer may be started based on the starting condition included in the configuration information, as well as a relative location relationship between the terminal and a satellite.

In the example of the disclosure, the configuration information may further include ephemeris information of the satellite. The terminal determines the relative location relationship between the terminal and the satellite based on the ephemeris information and the location information of the terminal.

In an implementation, the ephemeris information of the satellite may be determined through indication information sent by a network.

In another implementation, the ephemeris information of the satellite may also be determined based on information pre-stored in an SIM card.

The first timer is started in a case that the relative location relationship between the terminal and the satellite meets the starting condition included in the configuration information.

In further another implementation, the first timer may be started based on the starting condition included in the configuration information, as well as a relative location relationship between the terminal and a cell.

In the example of the disclosure, the configuration information may further include coverage information of the cell. The terminal determines the relative location relationship between the terminal and the cell based on its own location information and the coverage information of the cell. The first timer is started in a case that the relative location relationship between the terminal and the cell meets the starting condition included in the configuration information.

If the configuration information includes the ephemeris information of the satellite, location information of the satellite is acquired from the ephemeris information to obtain the relative location relationship between the terminal and the satellite. The relative location relationship between the terminal and the satellite may be a distance between the terminal and the satellite.

In the example of the disclosure, if the terminal determines to start the first timer based on the configuration information, the following implementations may be included.

In an implementation, the configuration information includes information of a second timer, for example, the second timer may be a timer T310 in the related art. If it is determined based on the information of the second timer that the second timer is started, then the first timer is started.

In further another implementation, the configuration information includes start time information of the first timer. The terminal starts the first timer based on the start time information.

In another implementation, the configuration information further includes a first value. The first timer is started upon receiving consecutive out-of-sync indications for the first value times.

In the example of the disclosure, the terminal may start the first timer based on a magnitude of an elevation angle between the terminal and the satellite.

If the starting condition includes that the magnitude of the elevation angle between the terminal and the satellite is greater than or equal to an elevation angle threshold, the first timer is started in a case that the magnitude of the elevation angle between the terminal and the satellite is greater than or equal to the elevation angle threshold.

If the starting condition includes that the magnitude of the elevation angle between the terminal and the satellite is greater than the elevation angle threshold, the first timer is started in a case that the magnitude of the elevation angle between the terminal and the satellite is greater than the elevation angle threshold.

If the configuration information further includes a triggering time of the elevation angle, the first timer is started in a case that the magnitude of the elevation angle between the terminal and the satellite is continuously greater than or equal to the elevation angle threshold within the triggering time. Or, the first timer is started in a case that the magnitude of the elevation angle between the terminal and the satellite is continuously greater than the elevation angle threshold within the triggering time.

As mentioned above, the terminal may start the first timer based on the starting condition included in the configuration information, as well as the relative location relationship between the terminal and the satellite.

In some examples of the disclosure, if the first timer is started based on the relative location relationship between the terminal and the satellite, the implementations are as follows.

If the starting condition includes that the distance between the terminal and the satellite is greater than a first threshold, the first timer is started in a case of determining that the distance between the terminal and the satellite is greater than the first threshold.

Or, if the starting condition includes that the distance between the terminal and the satellite is greater than or equal to the first threshold, the first timer is started in a case of determining that the distance between the terminal and the satellite is greater than or equal to the first threshold.

The starting condition may further include at least one of the triggering time or a hysteresis value corresponding to the relative location relationship between the terminal and the satellite.

If the starting condition includes the triggering time, the terminal starts the first timer in a case that the distance between the terminal and the satellite is continuously greater than the first threshold within the triggering time; otherwise, the first timer is not started.

If the starting condition includes the triggering time, the terminal starts the first timer in a case that the distance between the terminal and the satellite is continuously greater than or equal to the first threshold within the triggering time; otherwise, the first timer is not started.

If the starting condition includes the hysteresis value, after the terminal determines the distance between the terminal and the satellite, the hysteresis value is added (or subtracted) based on the distance to obtain a corrected distance. The corrected distance is compared with the first threshold, and the first timer is determined to be started based on comparison results.

It needs to be noted that the above implementations may be implemented separately or in any combination.

In response to determining that the configuration information includes the coverage information of the cell, the relative location relationship between the terminal and the satellite may also be obtained based on the location information of the terminal and the coverage information of the cell. As mentioned above, the relative location relationship between the terminal and the cell may be a distance between the terminal and a cell reference location. The distance between the terminal and the cell reference location may further be a distance between the terminal and a cell edge reference location, or a distance between the terminal and a cell center reference location.

In an implementation, the cell is a serving cell where the terminal performs communication based on the satellite.

In another implementation, the cell is a neighbor cell where the terminal performs communication based on the satellite.

In some other examples of the disclosure, if the first timer is started based on the relative location relationship between the terminal and the cell, the implementations are as follows.

In an implementation, the cell is a serving cell where the terminal performs communication based on the satellite.

In another implementation, the cell is a neighbor cell where the terminal performs communication based on the satellite.

In the example of the disclosure, a cell center reference location and a cell edge reference location may be acquired based on a cell coverage area.

In the example of the disclosure, cell coverage area information may be contained in the ephemeris information.

In an implementation, the starting condition includes that the distance between the terminal and the cell reference location is greater than a second threshold. Under this starting condition, the first timer is started in response to determining that the distance between the terminal and the cell reference location is greater than the second threshold. The cell reference location is the cell center reference location.

In another implementation, the starting condition includes that the distance between the terminal and the cell reference location is greater than or equal to the second threshold. Under this starting condition, the first timer is started in response to determining that the distance between the terminal and the cell reference location is greater than or equal to the second threshold. The cell reference location is the cell center reference location.

In another implementation, the starting condition includes that the distance between the terminal and the cell reference location is greater than the second threshold and the second timer is started. The first timer is started in a case that the distance between the terminal and the cell reference location is greater than the second threshold and the second timer is started. The second timer may be a timer T310.

In another implementation, the starting condition includes that the distance between the terminal and the cell reference location is greater than or equal to the second threshold and the second timer is started. The first timer is started in a case that the distance between the terminal and the cell reference location is greater than or equal to the second threshold and the second timer is started. The second timer may be a timer T310.

In a case of starting the first timer based on the relative location relationship between the terminal and the cell, the starting condition further includes one or more of a triggering time and a hysteresis value.

If the starting condition includes the triggering time, the terminal starts the first timer in a case that the distance between the terminal and the cell reference location is continuously greater than the second threshold within the triggering time, or the distance between the terminal and the cell reference location is greater than the second threshold and the second timer is started; otherwise, the first timer is not started.

If the starting condition includes the triggering time, the terminal starts the first timer in a case that the distance between the terminal and the cell reference location is greater than or equal to the second threshold within the triggering time, or the distance between the terminal and the cell reference location is greater than or equal to the second threshold and the second timer is started; otherwise, the first timer is not started.

If the starting condition includes the hysteresis value, after the terminal determines the distance between the terminal and the cell, the hysteresis value is added (or subtracted) based on the distance to obtain a corrected distance. The corrected distance is compared with the second threshold, and the first timer is determined to be started based on comparison results.

In another implementation, the starting condition may further include that the distance between the terminal and the cell reference location is less than a third threshold. Under this starting condition, the first timer is started in response to determining that the distance between the terminal and the cell reference location is less than the third threshold.

In another implementation, the starting condition may further include that the distance between the terminal and the cell reference location is less than or equal to the third threshold. Under this starting condition, the first timer is started in response to determining that the distance between the terminal and the cell reference location is less than or equal to the third threshold.

If the starting condition includes the triggering time, the terminal starts the first timer in a case that the distance between the terminal and the cell reference location is less than the third threshold within the triggering time; otherwise, the first timer is not started.

If the starting condition includes the hysteresis value, after the terminal determines the distance between the terminal and the cell, the hysteresis value is added (or subtracted) based on the distance to obtain a corrected distance. The corrected distance is compared with the third threshold, and the first timer is determined to be started based on comparison results.

In the example of the disclosure, the triggering time and/or the hysteresis value may have different or the same value in different situations, which is not specifically limited here.

It needs to be noted that the above implementations may be implemented separately or in any combination.

In some other examples of the disclosure, if the first timer is started based on the start time information, the implementations are as follows.

A start time threshold value included in the configuration information is determined, and the first timer is determined to be started based on the start time threshold value. For example, the first timer is started in a case that the start time information exceeds the start time threshold value.

In the example of the disclosure, if the starting condition is met and the first timer is started, RLF is detected in response to determining timeout of the first timer.

The starting condition may be used separately or in combination, which is not specifically limited here.

In the example of the disclosure, a stopping condition included in the configuration information may be indicated by the network device or specified through a protocol, as mentioned above, which is not specifically limited here. It may be understood that if the stopping condition of the terminal is indicated by the network device, the network device may dynamically indicate or reconfigure the stopping condition according to the actual situation.

In the example of the disclosure, multiple ways to stop the first timer are included.

If the terminal determines to stop the first timer based on the configuration information and the location information of the terminal, the following implementations may be included.

In an implementation, the first timer may be stopped based on the stopping condition included in the configuration information, as well as the relative location relationship between the terminal and the satellite.

The first timer is stopped in a case that the relative location relationship between the terminal and the satellite meets the stopping condition included in the configuration information.

In further another implementation, the first timer may be stopped based on the stopping condition included in the configuration information, as well as the relative location relationship between the terminal and the cell.

If the configuration information includes the ephemeris information of the satellite, location information of the satellite is acquired from the ephemeris information to obtain the relative location relationship between the terminal and the satellite. The relative location relationship between the terminal and the satellite may be a distance between the terminal and the satellite or a distance between the terminal and the cell reference location. In the example of the disclosure, cell coverage area information may be contained in the ephemeris information.

In the example of the disclosure, if the terminal determines to stop the first timer based on the configuration information, the following implementations may be included.

In an implementation, the configuration information includes information of the second timer, for example, the second timer may be a timer T310 in the related art. If it is determined based on the information of the second timer that the second timer is stopped, then the first timer is stopped.

In further another implementation, the configuration information includes stop time information of the first timer. The terminal stops the first timer based on the stop time information.

In another implementation, the configuration information further includes a second value. The first timer is stopped upon receiving consecutive in-sync indications for the second value times.

In the example of the disclosure, the terminal may stop the first timer based on a magnitude of an elevation angle between the terminal and the satellite.

If the stopping condition includes that the magnitude of the elevation angle between the terminal and the satellite is less than or equal to an elevation angle threshold, the first timer is stopped in a case that the magnitude of the elevation angle between the terminal and the satellite is less than or equal to the elevation angle threshold.

If the stopping condition includes that the magnitude of the elevation angle between the terminal and the satellite is less than the elevation angle threshold, the first timer is stopped in a case that the magnitude of the elevation angle between the terminal and the satellite is less than the elevation angle threshold.

If the configuration information further includes a triggering time of the elevation angle, the first timer is stopped in a case that the magnitude of the elevation angle between the terminal and the satellite is continuously less than or equal to the elevation angle threshold within the triggering time. Or, the first timer is stopped in a case that the magnitude of the elevation angle between the terminal and the satellite is less than the elevation angle threshold within the triggering time.

As mentioned above, the terminal may stop the first timer based on the stopping condition included in the configuration information, as well as the relative location relationship between the terminal and the satellite.

In some examples of the disclosure, if the first timer is stopped based on the relative location relationship between the terminal and the cell, the implementations are as follows.

If the stopping condition includes that the distance between the terminal and the satellite is less than a fourth threshold, the first timer is stopped in a case of determining that the distance between the terminal and the satellite is less than the fourth threshold.

Or, if the stopping condition includes that the distance between the terminal and the satellite is less than or equal to the fourth threshold, the first timer is stopped in a case of determining that the distance between the terminal and the satellite is less than or equal to the fourth threshold.

If the stopping condition includes that the distance between the terminal and the satellite is less than the fourth threshold, the stopping condition may further include at least one of the triggering time or the hysteresis value corresponding to the relative location relationship between the terminal and the satellite.

If the stopping condition includes the triggering time, the terminal stops the first timer in a case that the distance between the terminal and the satellite is continuously less than the fourth threshold within the triggering time; otherwise, the first timer is not stopped.

If the stopping condition includes the triggering time, the terminal stops the first timer in a case that the distance between the terminal and the satellite is continuously less than or equal to the fourth threshold within the triggering time; otherwise, the first timer is not stopped.

If the stopping condition includes the hysteresis value, after the terminal determines the distance between the terminal and the satellite, the hysteresis value is added (or subtracted) based on the distance to obtain the corrected distance. The corrected distance is compared with the fourth threshold, and the first timer is determined to be stopped based on comparison results.

It needs to be noted that the above implementations may be implemented separately or in any combination.

In response to determining that the configuration information includes the coverage information of the cell, the relative location relationship between the terminal and the satellite may also be obtained based on the location information of the terminal and the coverage information of the cell. As mentioned above, the relative location relationship between the terminal and the cell may be a distance between the terminal and a cell reference location. The distance between the terminal and the cell reference location may further be a distance between the terminal and a cell edge reference location, or a distance between the terminal and a cell center reference location.

In an implementation, the cell is a serving cell where the terminal performs communication based on the satellite.

In another implementation, the cell is a neighbor cell where the terminal performs communication based on the satellite.

In some other examples of the disclosure, if the first timer is stopped based on the relative location relationship between the terminal and the cell, the implementations are as follows.

In the example of the disclosure, a cell center reference location and a cell edge reference location may be acquired based on a cell coverage area.

In an implementation, the cell is a serving cell where the terminal performs communication based on the satellite.

In another implementation, the cell is a neighbor cell where the terminal performs communication based on the satellite.

In the example of the disclosure, a cell center reference location and a cell edge reference location may be acquired based on a cell coverage area.

In an implementation, the stopping condition includes that the distance between the terminal and the cell reference location is less than a fifth threshold. Under this stopping condition, the first timer is stopped in response to determining that the distance between the terminal and the cell reference location is less than the fifth threshold. The cell reference location is the cell center reference location.

In another implementation, the starting condition includes that the distance between the terminal and the cell reference location is less than or equal to the fifth threshold. Under this starting condition, the first timer is stopped in response to determining that the distance between the terminal and the cell reference location is less than or equal to the fifth threshold. The cell reference location is the cell center reference location.

In another implementation, the stopping condition includes that the distance between the terminal and the cell reference location is less than the fifth threshold and the second timer is stopped. The first timer is stopped in a case that the distance between the terminal and the cell reference location is less than the fifth threshold and the second timer is stopped.

In another implementation, the starting condition includes that the distance between the terminal and the cell reference location is less than or equal to the fifth threshold and the second timer is started. The first timer is stopped in a case that the distance between the terminal and the cell reference location is less than or equal to the fifth threshold and the second timer is stopped. The second timer may be a timer T310.

In a case of stopping the first timer based on the relative location relationship between the terminal and the cell, the stopping condition further includes one or more of a triggering time and a hysteresis value.

If the stopping condition includes the triggering time, the terminal stops the first timer in a case that the distance between the terminal and the cell reference location is less than the fifth threshold within the triggering time, or the distance between the terminal and the cell reference location is less than the fifth threshold and the second timer is stopped; otherwise, the first timer is not stopped.

If the stopping condition includes the triggering time, the terminal stops the first timer in a case that the distance between the terminal and the cell reference location is less than or equal to the fifth threshold within the triggering time, or the distance between the terminal and the cell reference location is less than or equal to the fifth threshold and the second timer is stopped; otherwise, the first timer is not stopped.

If the stopping condition includes the hysteresis value, after the terminal determines the distance between the terminal and the cell, the hysteresis value is added (or subtracted) based on the distance to obtain the corrected distance. The corrected distance is compared with the fifth threshold, and the first timer is determined to be stopped based on comparison results.

In another implementation, the stopping condition may further include that the distance between the terminal and the cell reference location is greater than a sixth threshold. Under this stopping condition, the first timer is stopped in response to determining that the distance between the terminal and the cell reference location is greater than the sixth threshold. The cell reference location is a cell edge reference location.

In another implementation, the stopping condition may further include that the distance between the terminal and the cell reference location is greater than or equal to the sixth threshold. Under this stopping condition, the first timer is stopped in response to determining that the distance between the terminal and the cell reference location is greater than or equal to the sixth threshold. The cell reference location is the cell edge reference location.

The stopping condition further includes one or more of the triggering time and the hysteresis value.

If the stopping condition includes the triggering time, the terminal stops the first timer in a case that the distance between the terminal and the cell reference location is greater than the sixth threshold within the triggering time; otherwise, the first timer is not stopped.

If the stopping condition includes the triggering time, the terminal stops the first timer in a case that the distance between the terminal and the cell reference location is greater than or equal to the sixth threshold within the triggering time; otherwise, the first timer is not stopped.

If the stopping condition includes the hysteresis value, after the terminal determines the distance between the terminal and the cell, the hysteresis value is added (or subtracted) based on the distance to obtain the corrected distance. The corrected distance is compared with the sixth threshold, and the first timer is determined to be stopped based on comparison results.

It needs to be noted that the above implementations may be implemented separately or in any combination.

In some other examples of the disclosure, if the first timer is stopped based on stop time information, the implementations are as follows.

A stop time threshold value included in the configuration information is determined, and the first timer is determined to be stopped based on the stop time threshold value. For example, the first timer is stopped in a case that the stop time information exceeds the stop time threshold value.

In the example of the disclosure, the triggering time and/or the hysteresis value may have different or the same value in different situations, which is not specifically limited here.

The stopping condition may be used separately or in combination, which is not specifically limited here.

In the following implementations, the implementation that the terminal determines a timer duration for RLF detection based on its own location information and network configuration information is illustrated below.

Figure 3:
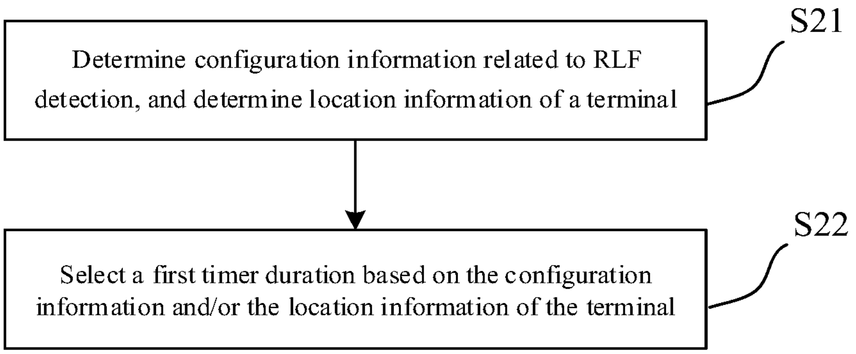
FIG. 3 is a flow diagram of an RLF detection method shown according to an example.

FIG. 3 is a flow diagram of an RLF detection method shown according to an example. As shown in FIG. 3, the RLF detection method is executed by a terminal and includes the following steps.

In step S21, configuration information related to RLF detection is determined, and location information of the terminal is determined.

In step S22, a first timer duration is selected based on the configuration information and/or the location information of the terminal.

The first timer duration is used for RLF detection.

In the example of the disclosure, the terminal determines the configuration information related to the RLF detection and configured by a network device, or receives signaling sent by the network device, and determines the configuration information related to the RLF detection based on the signaling. The signaling may be a broadcast message, proprietary signaling or the like.

Further, the terminal selects the corresponding first timer duration according to the obtained configuration information related to the RLF detection and/or the location information of the terminal.

Through the RLF detection method provided by the example of the disclosure, the first timer duration for RLF detection is selected according to a location of the terminal, so that an appropriate timer duration may be determined based on the location of the terminal, and an RLF may be detected within a time corresponding to the location of the terminal, which can reduce RRC reestablishment, or ensure that a network transmission environment can be recovered in time, so that the terminal can quickly recover a connection with a network or enter an idle state.

A selection condition for selecting the timer duration included in the configuration information may be indicated by the network device or specified through a protocol, as mentioned above, which is not specifically limited here. It may be understood that if the selection condition is indicated by the network device to the terminal, the network device may dynamically indicate the selection condition according to the actual situation.

In the example of the disclosure, multiple ways to select the corresponding first timer duration are included.

If the terminal selects the corresponding first timer duration based on the configuration information and the location information of the terminal, the following implementations may be included.

In an implementation, the corresponding first timer duration may be selected based on the selection condition included in the configuration information, as well as a relative location relationship between the terminal and a satellite.

In the example of the disclosure, the configuration information includes a plurality of timer durations and a corresponding selection condition for each timer duration. The terminal may select the corresponding first timer duration from the plurality of timer durations based on the selection condition included in the configuration information, as well as a relative location relationship between the terminal and a cell.

In the example of the disclosure, the configuration information may further include ephemeris information of the satellite. The terminal determines the relative location relationship between the terminal and the satellite based on the ephemeris information and the location information of the terminal. The corresponding first timer duration is selected in a case that the relative location relationship between the terminal and the satellite meets the selection condition included in the configuration information.

In an implementation, the ephemeris information of the satellite may be determined through indication information sent by a network.

In another implementation, the ephemeris information of the satellite may also be determined based on information pre-stored in an SIM card.

The relative location relationship between the terminal and the satellite may be a distance between the terminal and the satellite.

In the example of the disclosure, the configuration information may further include coverage information of the cell. The terminal determines the relative location relationship between the terminal and the cell based on its own location information and the coverage information of the cell. The corresponding first timer duration is selected in a case that the relative location relationship between the terminal and the cell meets the selection condition included in the configuration information.

The distance between the terminal and a cell reference location may further be a distance between the terminal and a cell edge reference location, or a distance between the terminal and a cell center reference location.

If the terminal selects the corresponding first timer duration based on the configuration information, the following implementations may be included.

In the example of the disclosure, the terminal may select the corresponding first timer duration based on a magnitude of an elevation angle between the terminal and the satellite.

If the selection condition includes that the magnitude of the elevation angle between the terminal and the satellite is greater than or equal to an elevation angle threshold, the corresponding first timer duration is selected in a case that the magnitude of the elevation angle between the terminal and the satellite is greater than or equal to the elevation angle threshold.

If the selection condition includes that the magnitude of the elevation angle between the terminal and the satellite is greater than the elevation angle threshold, the corresponding first timer duration is selected in a case that the magnitude of the elevation angle between the terminal and the satellite is greater than the elevation angle threshold.

If the configuration information further includes a triggering time of the elevation angle, the corresponding first timer duration is selected in a case that the magnitude of the elevation angle between the terminal and the satellite is greater than or equal to the elevation angle threshold within the triggering time. Or, the corresponding first timer duration is selected in a case that the magnitude of the elevation angle between the terminal and the satellite is greater than the elevation angle threshold within the triggering time.

As mentioned above, the terminal may select the corresponding first timer duration based on the selection condition included in the configuration information, as well as the relative location relationship between the terminal and the satellite.

In an implementation, if the selection condition is that the distance between the terminal and the satellite is greater than a seventh threshold, the corresponding first timer duration is selected in a case of determining that the distance between the terminal and the satellite is greater than the seventh threshold.

In another implementation, if the selection condition is that the distance between the terminal and the satellite is greater than or equal to the seventh threshold, the corresponding first timer duration is selected in a case of determining that the distance between the terminal and the satellite is greater than or equal to the seventh threshold.

In the example of the disclosure, a corresponding second timer duration is selected in a case of determining that the distance between the terminal and the satellite is less than the seventh threshold. Or, a specified timer duration is selected as the second timer duration in a case of determining that the distance between the terminal and the satellite is less than the seventh threshold. A specified timer may be a timer T310.

In the example of the disclosure, the corresponding second timer duration is selected in a case of determining that the distance between the terminal and the satellite is less than or equal to the seventh threshold. Or, the specified timer duration is selected as the second timer duration in a case of determining that the distance between the terminal and the satellite is less than or equal to the seventh threshold. The specified timer may be the timer T310.

If the selection condition includes that the distance between the terminal and the satellite is greater than the seventh threshold, the selection condition may further include at least one of a triggering time or a hysteresis value corresponding to the relative location relationship between the terminal and the satellite.

If the selection condition includes the triggering time, the terminal selects the corresponding first timer duration in a case that the distance between the terminal and the satellite is continuously greater than the seventh threshold within the triggering time; otherwise, the corresponding second timer duration is selected.

If the selection condition includes the hysteresis value, after the terminal determines the distance between the terminal and the satellite, the hysteresis value is added (or subtracted) based on the distance to obtain a corrected distance. The corrected distance is compared with the seventh threshold, and the corresponding first timer duration or the corresponding second timer duration is selected based on comparison results.

In response to determining that the configuration information includes coverage information of the cell, the relative location relationship between the terminal and the satellite may also be obtained based on the location information of the terminal and the coverage information of the cell. As mentioned above, the relative location relationship between the terminal and the cell may be a distance between the terminal and a cell reference location. The distance between the terminal and the cell reference location may further be a distance between the terminal and a cell edge reference location, or a distance between the terminal and a cell center reference location.

In an implementation, the cell is a serving cell where the terminal performs communication based on the satellite.

In another implementation, the cell is a neighbor cell where the terminal performs communication based on the satellite.

In the example of the disclosure, a cell center reference location and a cell edge reference location may be acquired based on a cell coverage area.

In the example of the disclosure, cell coverage area information may be contained in the ephemeris information.

In an implementation, the selection condition includes that the distance between the terminal and the cell reference location is greater than an eighth threshold. Under this selection condition, the corresponding first timer duration is selected in response to determining that the distance between the terminal and the cell reference location is greater than the eighth threshold. The cell reference location is the cell center reference location.

In another implementation, the selection condition includes that the distance between the terminal and the cell reference location is greater than or equal to the eighth threshold. Under this selection condition, the corresponding first timer duration is selected in response to determining that the distance between the terminal and the cell reference location is greater than or equal to the eighth threshold. The cell reference location is the cell center reference location.

In another implementation, the selection condition includes that the distance between the terminal and the cell reference location is greater than the eighth threshold and a second timer is started. The corresponding first timer duration is selected in a case that the distance between the terminal and the cell reference location is greater than the eighth threshold and the second timer is started. The second timer may be a timer T310.

In another implementation, the selection condition includes that the distance between the terminal and the cell reference location is greater than or equal to the eighth threshold and the second timer is started. The corresponding first timer duration is selected in a case that the distance between the terminal and the cell reference location is greater than or equal to the eighth threshold and the second timer is selected. The second timer may be the timer T310.

In a case of selecting the corresponding first timer duration based on the relative location relationship between the terminal and the cell, the selection condition further includes one or more of a triggering time and a hysteresis value.

If the selection condition includes the triggering time, the terminal selects the corresponding first timer duration in a case that the distance between the terminal and the cell reference location is continuously greater than the eighth threshold within the triggering time, or the distance between the terminal and the cell reference location is greater than the eighth threshold and the second timer is started; otherwise, the corresponding second timer duration is selected.

If the selection condition includes the triggering time, the terminal selects the corresponding first timer duration in a case that the distance between the terminal and the cell reference location is greater than or equal to the eighth threshold within the triggering time, or the distance between the terminal and the cell reference location is greater than or equal to the eighth threshold and the second timer is started; otherwise, the corresponding second timer duration is selected.

If the selection condition includes the hysteresis value, after the terminal determines the distance between the terminal and the cell, the hysteresis value is added (or subtracted) based on the distance to obtain the corrected distance. The corrected distance is compared with the eighth threshold, and the corresponding first timer duration is selected based on comparison results.

In another implementation, the selection condition may further include that the distance between the terminal and the cell reference location is less than a ninth threshold. Under this selection condition, the corresponding first timer duration is selected in response to determining that the distance between the terminal and the cell reference location is less than the ninth threshold.

In another implementation, the selection condition may further include that the distance between the terminal and the cell reference location is less than or equal to the ninth threshold. Under this selection condition, the corresponding first timer duration is selected in response to determining that the distance between the terminal and the cell reference location is less than or equal to the ninth threshold.

The selection condition further includes one or more of the triggering time and the hysteresis value.

If the selection condition includes the triggering time, the terminal selects the corresponding first timer duration in a case that the distance between the terminal and the cell reference location is less than the ninth threshold within the triggering time; otherwise, the corresponding second timer duration is selected.

If the selection condition includes the hysteresis value, after the terminal determines the distance between the terminal and the cell, the hysteresis value is added (or subtracted) based on the distance to obtain the corrected distance. The corrected distance is compared with the ninth threshold, and the corresponding second timer duration is selected based on comparison results.

In the example of the disclosure, the triggering time and/or the hysteresis value may have different or the same value in different situations, which is not specifically limited here.

It needs to be noted that the above implementations may be implemented separately or in any combination.

In the example of the disclosure, if the selection condition is met, the corresponding first timer duration is selected, and it is determined that RLF is detected when the first timer duration times out.

In the example of the disclosure, if any of the selection conditions is not met, a default timer duration is selected, and it is determined that RLF is detected when the default timer duration times out.

The default timer duration may be specified through a protocol, configured by the network, implemented by the terminal.

The selection condition may be used separately or in combination, which is not specifically limited here.

Figure 4:
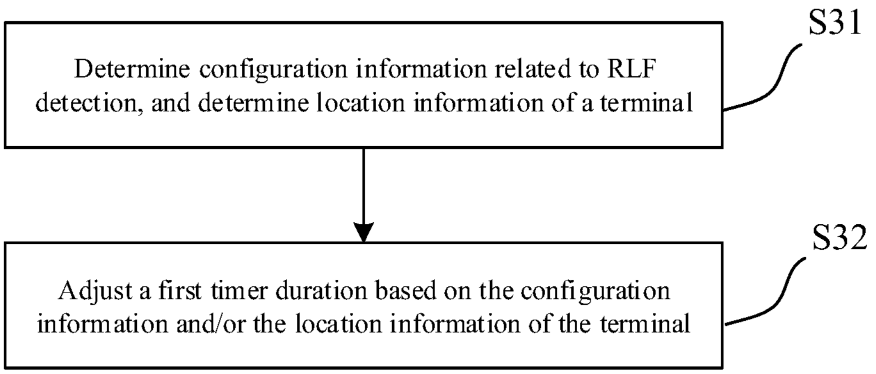
FIG. 4 is a flow diagram of an RLF detection method shown according to an example.

FIG. 4 is a flow diagram of an RLF detection method shown according to an example. As shown in FIG. 4, the RLF detection method is executed by a terminal and includes the following steps.

In step S31, configuration information related to RLF detection is determined, and location information of the terminal is determined.

In step S32, a first timer duration is adjusted based on the configuration information and/or the location information of the terminal.

In the example of the disclosure, the adjusted first timer duration is used for RLF detection. The terminal may select the corresponding scaling factor according to the configuration information and/or the location information of the terminal, and adjust the first timer duration based on the scaling factor.

In the example of the disclosure, the terminal determines the configuration information related to the RLF detection and configured by a network device, or receives signaling sent by the network device, and determines the configuration information related to the RLF detection based on the signaling. The signaling may be a broadcast message, proprietary signaling or the like.

Further, the terminal selects the corresponding scaling factor according to the obtained configuration information related to the RLF detection and/or the location information of the terminal in a case that a selection condition included in the configuration information is met.

Through the RLF detection method provided by the example of the disclosure, the scaling factor for RLF detection is selected according to a location of the terminal, so that an appropriate timer duration may be determined based on the location of the terminal, and an RLF is detected within a time corresponding to the location of the terminal, which can reduce RRC reestablishment, or ensure that a network transmission environment can be recovered in time, so that the terminal can quickly recover a connection with a network or enter an idle state.

The selection condition for selecting the corresponding scaling factor included in the configuration information may be indicated by the network device or specified through a protocol, as mentioned above, which is not specifically limited here. It may be understood that if the selection condition for the terminal is indicated by the network device, the network device may dynamically indicate the selection condition according to the actual situation.

In the example of the disclosure, the configuration information includes one or more scaling factors and a corresponding selection condition for each scaling factor.

If the terminal selects the corresponding scaling factor based on the configuration information and the location information of the terminal in a case that the selection condition included in the configuration information is met, the following implementations may be included.

In an implementation, the corresponding scaling factor may be selected based on the selection condition included in the configuration information, as well as a relative location relationship between the terminal and a satellite.

In the example of the disclosure, the configuration information may further include ephemeris information of the satellite. The terminal determines the relative location relationship between the terminal and the satellite based on the ephemeris information and the location information of the terminal. The corresponding scaling factor is selected in a case that the relative location relationship between the terminal and the satellite meets the selection condition included in the configuration information.

In an implementation, the ephemeris information of the satellite may be determined through indication information sent by a network.

In another implementation, the ephemeris information of the satellite may also be determined based on information pre-stored in an SIM card.

In the example of the disclosure, the terminal may select the corresponding scaling factor from a plurality of timer durations based on the selection condition included in the configuration information, as well as a relative location relationship between the terminal and a cell.

If the configuration information includes the ephemeris information of the satellite, location information of the satellite is acquired from the ephemeris information to obtain the relative location relationship between the terminal and the satellite. The relative location relationship between the terminal and the satellite may be a distance between the terminal and the satellite or a distance between the terminal and the cell reference location.

If the terminal selects the corresponding scaling factor based on the configuration information, the following implementations may be included.

In the example of the disclosure, the terminal may select the corresponding scaling factor based on a magnitude of an elevation angle between the terminal and the satellite.

If the selection condition includes that the magnitude of the elevation angle between the terminal and the satellite is greater than or equal to an elevation angle threshold, the corresponding scaling factor is selected in a case that the magnitude of the elevation angle between the terminal and the satellite is greater than or equal to the elevation angle threshold, and the first timer duration is adjusted based on the corresponding scaling factor.

If the selection condition includes that the magnitude of the elevation angle between the terminal and the satellite is greater than the elevation angle threshold, the corresponding scaling factor is selected in a case that the magnitude of the elevation angle between the terminal and the satellite is greater than the elevation angle threshold, and the first timer duration is adjusted based on the corresponding scaling factor.

If the configuration information further includes a triggering time of the elevation angle, the corresponding scaling factor is selected in a case that the magnitude of the elevation angle between the terminal and the satellite is greater than or equal to the elevation angle threshold within the triggering time, and the first timer duration is adjusted based on the corresponding scaling factor.

If the configuration information further includes the triggering time of the elevation angle, the corresponding scaling factor is selected in a case that the magnitude of the elevation angle between the terminal and the satellite is greater than the elevation angle threshold within the triggering time, and the first timer duration is adjusted based on the corresponding scaling factor.

As mentioned above, the terminal may select the corresponding scaling factor based on the selection condition included in the configuration information, as well as the relative location relationship between the terminal and the satellite, and the first timer duration is adjusted based on the corresponding scaling factor.

For example, a timer is specified as T310, the corresponding scaling factor is used to multiply by a duration of T310 to obtain the scaled timer duration, and the scaled timer duration is determined as the first timer duration.

In an implementation, if the selection condition is that the distance between the terminal and the satellite is greater than a tenth threshold, the corresponding scaling factor is selected in a case of determining that the distance between the terminal and the satellite is greater than the tenth threshold, and the first timer duration is adjusted based on the corresponding scaling factor.

In another implementation, if the selection condition is that the distance between the terminal and the satellite is greater than or equal to the tenth threshold, the corresponding scaling factor is selected in a case of determining that the distance between the terminal and the satellite is greater than or equal to the tenth threshold, and the first timer duration is adjusted based on the corresponding scaling factor.

In the example of the disclosure, a second timer duration is selected in a case of determining that the distance between the terminal and the satellite is less than the tenth threshold. Or, a specified timer duration is selected as the second timer duration in a case of determining that the distance between the terminal and the satellite is less than the tenth threshold. The specified timer may be a timer T310.

In the example of the disclosure, the second timer duration is selected in a case of determining that the distance between the terminal and the satellite is less than or equal to the tenth threshold. Or, the specified timer duration is selected as the second timer duration in a case of determining that the distance between the terminal and the satellite is less than or equal to the tenth threshold. The specified timer may be the timer T310.

If the selection condition includes that the distance between the terminal and the satellite is greater than the tenth threshold, the selection condition may further include at least one of a triggering time or a hysteresis value corresponding to the relative location relationship between the terminal and the satellite.

If the selection condition includes the triggering time, the terminal selects the corresponding scaling factor in a case that the distance between the terminal and the satellite is continuously greater than the tenth threshold within the triggering time, and the first timer duration is adjusted based on the corresponding scaling factor. Otherwise, the first timer duration is not adjusted based on the corresponding scaling factor.

If the selection condition includes the hysteresis value, after the terminal determines the distance between the terminal and the satellite, the hysteresis value is added (or subtracted) based on the distance to obtain a corrected distance. The corrected distance is compared with the tenth threshold, and the corresponding scaling factor is selected based on the comparison results, and the first timer duration is adjusted or the first timer duration is not adjusted based on the corresponding scaling factor.

In the example of the disclosure, the triggering time and/or the hysteresis value may have different or the same value in different situations, which is not specifically limited here.

In the example of the disclosure, the configuration information may further include coverage information of the cell. The terminal determines the relative location relationship between the terminal and the cell based on its own location information and the coverage information of the cell. The corresponding scaling factor is selected in a case that the relative location relationship between the terminal and the cell meets the selection condition included in the configuration information.

In response to determining that the configuration information includes the coverage information of the cell, the relative location relationship between the terminal and the satellite may also be obtained based on the location information of the terminal and the coverage information of the cell. As mentioned above, the relative location relationship between the terminal and the cell may be a distance between the terminal and a cell reference location. The distance between the terminal and the cell reference location may further be a distance between the terminal and a cell edge reference location, or a distance between the terminal and a cell center reference location.

In an implementation, the cell is a serving cell where the terminal performs communication based on the satellite.

In another implementation, the cell is a neighbor cell where the terminal performs communication based on the satellite.

In the example of the disclosure, a cell center reference location and a cell edge reference location may be acquired based on a cell coverage area.

In the example of the disclosure, cell coverage area information may be contained in the ephemeris information.

In an implementation, the selection condition includes that the distance between the terminal and the cell reference location is greater than an eleventh threshold. Under this selection condition, the first timer duration is adjusted in response to determining that the distance between the terminal and the cell reference location is greater than the eleventh threshold. The cell reference location is the cell center reference location.

In another implementation, the selection condition includes that the distance between the terminal and the cell reference location is greater than or equal to the eleventh threshold. Under this selection condition, the first timer duration is adjusted based on the corresponding scaling factor in response to determining that the distance between the terminal and the cell reference location is greater than or equal to the eleventh threshold. The cell reference location is the cell center reference location.

In another implementation, the selection condition includes that the distance between the terminal and the cell reference location is greater than the eleventh threshold and a second timer is started. The first timer duration is adjusted based on the corresponding scaling factor in a case that the distance between the terminal and the cell reference location is greater than the eleventh threshold and the second timer is started. The second timer may be the timer T310.

In another implementation, the selection condition includes that the distance between the terminal and the cell reference location is greater than or equal to the eleventh threshold and the second timer is started. The first timer duration is adjusted based on the corresponding scaling factor in a case that the distance between the terminal and the cell reference location is greater than or equal to the eleventh threshold and the second timer is selected. The second timer may be a timer T310.

In a case of the corresponding first timer duration is selected based on the relative location relationship between the terminal and the cell, the selection condition further includes one or more of a triggering time and a hysteresis value.

If the selection condition includes the triggering time, the terminal adjusts the first timer duration based on the corresponding scaling factor in a case that the distance between the terminal and the cell reference location is continuously greater than the eleventh threshold within the triggering time, or the distance between the terminal and the cell reference location is greater than the eleventh threshold and the second timer is started; otherwise, the first timer duration is not adjusted.

If the selection condition includes the triggering time, the terminal adjusts the first timer duration based on the corresponding scaling factor in a case that the distance between the terminal and the cell reference location is greater than or equal to the eleventh threshold within the triggering time, or the distance between the terminal and the cell reference location is greater than or equal to the eleventh threshold and the second timer is started; otherwise, the first timer duration is not adjusted.

If the selection condition includes the hysteresis value, after the terminal determines the distance between the terminal and the cell, the hysteresis value is added (or subtracted) based on the distance to obtain the corrected distance. The corrected distance is compared with the eleventh threshold, and it is determined based on comparison results that the first timer duration is adjusted based on the corresponding scaling factor.

In another implementation, the selection condition may further include that the distance between the terminal and the cell reference location is less than a twelfth threshold. Under this selection condition, the first timer duration is adjusted based on the corresponding scaling factor in response to determining that the distance between the terminal and the cell reference location is less than the twelfth threshold.

In another implementation, the selection condition may further include that the distance between the terminal and the cell reference location is less than or equal to the twelfth threshold. Under this selection condition, the first timer duration is adjusted based on the corresponding scaling factor in response to determining that the distance between the terminal and the cell reference location is less than or equal to the twelfth threshold.

If the selection condition includes the triggering time, the terminal adjusts the first timer duration based on the corresponding scaling factor in a case that the distance between the terminal and the cell reference location is less than the twelfth threshold within the triggering time; otherwise, the first timer duration is not adjusted.

If the selection condition includes the hysteresis value, after the terminal determines the distance between the terminal and the cell, the hysteresis value is added (or subtracted) based on the distance to obtain the corrected distance. The corrected distance is compared with the twelfth threshold, and it is determined based on comparison results that the first timer duration is adjusted based on the corresponding scaling factor.

In the example of the disclosure, the triggering time and/or the hysteresis value may have different or the same value in different situations, which is not specifically limited here.

It needs to be noted that the above implementations of the selection condition may be implemented separately or in any combination.

In the example of the disclosure, if the selection condition is met, the corresponding first timer duration is selected, and it is determined that RLF is detected when the first timer duration times out. Subsequent procedures such as RRC reestablishment are executed.

The selection condition may be used separately or in combination, which is not specifically limited here.

In the example of the disclosure, the triggering time and/or the hysteresis value may have different or the same value in different situations, which is not specifically limited here.

It needs to be further noted that the method provided by the disclosure may further be used to introduce a new counter and its configuration information, and determine a counter for RLF detection based on counters such as a counter N310 and a counter N311. Alternatively, based on the method provided by the disclosure, the corresponding scaling factor is configured for the specified counter, the corresponding scaling factor is selected based on the selection condition of the scaling factor, and the counter for RLF detection is determined based on the corresponding scaling factor. Thus RRC reestablishment can be reduced, or a network transmission environment can be ensured to be recovered in time, so that the terminal can quickly recover the connection with the network or enter an idle state.

Figure 5:
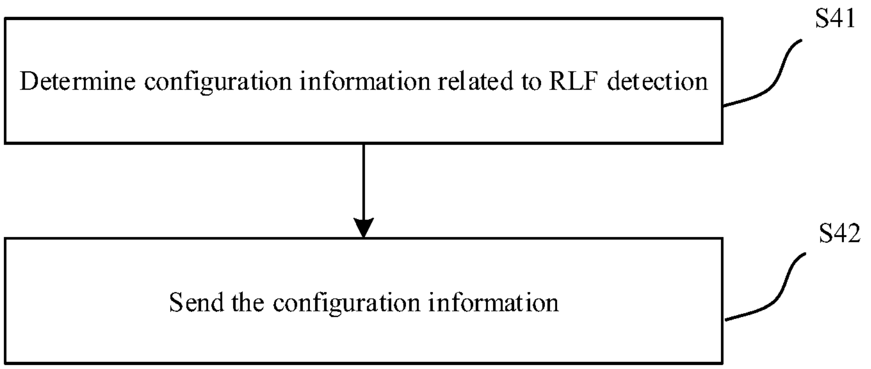
FIG. 5 is a flow diagram of an RLF detection method shown according to an example.

FIG. 5 is a flow diagram of an RLF detection method shown according to an example. As shown in FIG. 5, the RLF detection method is executed by a network device and includes the following steps.

In step S41, configuration information related to RLF detection is determined.

In step S42, the configuration information is sent.

In the example of the disclosure, the configuration information is used for the RLF detection.

In the example of the disclosure, the network device configures the configuration information related to the RLF detection, and sends the configuration information to a terminal based on the signaling. The configuration information related to the RLF detection is determined based on the signaling. The signaling may be a broadcast message, proprietary signaling or the like.

Through the RLF detection method provided by the example of the disclosure, a first timer for the RLF detection is started according to a location of the terminal, so that the corresponding first timer for the RLF detection may be determined based on different locations between the terminal and a satellite, which can reduce RRC reestablishment, or ensure that a network transmission environment is recovered in time, so that the terminal can quickly recover a connection with a network or enter an idle state.

The network device may dynamically indicate or reestablish a starting condition according to the actual situation.

In the example of the disclosure, the configuration information includes at least one of:

information of a second timer;

start time information of a first timer;

a first value, the first value being used for starting the first timer;

a starting condition, the starting condition being used for starting the first timer; or a stopping condition, the stopping condition being used for stopping the first timer.

In the example of the disclosure, the configuration information further includes ephemeris information of the satellite. The ephemeris information is used for determining a relative location relationship between the terminal and the satellite.

In an implementation, the network device sends the ephemeris information of the satellite to the terminal through an indication message.

In another implementation, the ephemeris information of the satellite may also be determined based on information pre-stored in an SIM card.

In the example of the disclosure, the starting condition includes at least one of:

a distance between the terminal and the satellite being greater than a first threshold;

a triggering time;

a hysteresis value;

a distance between the terminal and a cell reference location being greater than a second threshold;

the distance between the terminal and the cell reference location being less than a third threshold; or the distance between the terminal and the cell reference location being greater than the second threshold and the second timer being started.

In another implementation, the ephemeris information of the satellite may also be determined based on the information pre-stored in the SIM card.

In the example of the disclosure, the configuration information may further include coverage information of a cell. The relative location relationship between the terminal and the satellite may be a distance between the terminal and the satellite or the distance between the terminal and the cell reference location.

The configuration information includes the coverage information of the cell. As mentioned above, the relative location relationship between the terminal and the satellite may be the distance between the terminal and the satellite or the distance between the terminal and the cell reference location. The distance between the terminal and the cell reference location may further be a distance between the terminal and a cell edge reference location, or a distance between the terminal and a cell center reference location.

In the example of the disclosure, the starting condition includes that a magnitude of an elevation angle between the terminal and the satellite is greater than or equal to an elevation angle threshold.

In the example of the disclosure, the starting condition includes that the magnitude of the elevation angle between the terminal and the satellite is greater than the elevation angle threshold.

The distance between the terminal and the satellite may be a distance between the terminal and the cell, or the distance between the terminal and a cell center reference location, or a distance between the terminal and a satellite edge reference location.

In the example of the disclosure, the triggering time and/or the hysteresis value may have different or the same value in different situations, which is not specifically limited here.

It needs to be noted that the above implementations may be implemented separately or in any combination.

In an implementation of the disclosure, the configuration information includes a start time threshold value.

The starting condition may be used separately or in combination, which is not specifically limited here.

In the example of the disclosure, a stopping condition included in the configuration information which may be sent by the network device and may also be specified through a protocol, as mentioned above, which is not specifically limited here. It may be understood that if the stopping condition is indicated to the terminal by the network device, the network device may dynamically indicate or reconfigure the stopping condition according to the actual situation.

In the example of the disclosure, the stopping condition includes at least one of: the distance between the terminal and the satellite being less than a fourth threshold;

the triggering time;

the hysteresis value;

the distance between the terminal and the cell reference location being less than a fifth threshold;

the distance between the terminal and the cell reference location being greater than a sixth threshold; or the distance between the terminal and the cell reference location being less than the fifth threshold and a second timer being started.

In the example of the disclosure, the configuration information may further include coverage information of a cell.

In an implementation, the configuration information includes information of the second timer, for example, the second timer may be a timer T310 in the related art.

In further another implementation, the configuration information includes stop time information of the first timer.

In another implementation, the configuration information further includes a second value. The second value is used for stopping the first timer.

In another implementation, the stopping condition further includes that the magnitude of the elevation angle between the terminal and the satellite is less than or equal to the elevation angle threshold.

In another implementation, the stopping condition further includes that the magnitude of the elevation angle between the terminal and the satellite is less than the elevation angle threshold.

The relative location relationship between the terminal and the satellite may be the distance between the terminal and the satellite or the distance between the terminal and the cell reference location. The distance between the terminal and the cell reference location may further be a distance between the terminal and a cell edge reference location, or a distance between the terminal and a cell center reference location.

In the example of the disclosure, the stopping condition may further include that the distance between the terminal and the satellite is less than or equal to the fourth threshold.

In the example of the disclosure, a cell center reference location and a cell edge reference location may be acquired based on a cell coverage area.

It needs to be noted that the above implementations may be implemented separately or in any combination. The triggering time and the hysteresis value may have different or the same value in different situations, which is not specifically limited here.

In response to determining that the configuration information includes the coverage information of the cell, the relative location relationship between the terminal and the satellite may also be obtained based on the location information of the terminal and the coverage information of the cell. As mentioned above, the relative location relationship between the terminal and the cell may be the distance between the terminal and the cell reference location. The distance between the terminal and the cell reference location may further be a distance between the terminal and a cell edge reference location, or a distance between the terminal and a cell center reference location.

In an implementation, the cell is a serving cell where the terminal performs communication based on the satellite.

In another implementation, the cell is a neighbor cell where the terminal performs communication based on the satellite.

In some other examples of the disclosure, the stopping condition may further be determined based on the relative location relationship between the terminal and the cell.

In an implementation, the stopping condition includes that the distance between the terminal and the cell reference location is greater than a fifth threshold.

In an implementation, the stopping condition includes that the distance between the terminal and the cell reference location is greater than or equal to the fifth threshold.

In another implementation, the stopping condition includes that the distance between the terminal and the cell reference location is less than the fifth threshold and the second timer is stopped. The second timer may be a timer T310.

In another implementation, the stopping condition includes that the distance between the terminal and the cell reference location is less than or equal to the fifth threshold and the second timer is stopped.

In another implementation, the stopping condition may further include that the distance between the terminal and the cell reference location is greater than a sixth threshold.

In another implementation, the stopping condition may further include that the distance between the terminal and the cell reference location is greater than or equal to the sixth threshold.

In the example of the disclosure, the triggering time and/or the hysteresis value may have different or the same value in different situations, which is not specifically limited here.

It needs to be noted that the above implementations may be implemented separately or in any combination.

In some other examples of the disclosure, if the first timer is stopped based on stop time information, the implementations are as follows.

The configuration information includes a stop time threshold value.

The stopping condition may be used separately or in combination, which is not specifically limited here.

If the configuration information of the network device includes the plurality of timer durations, the implementations are as follows.

Figure 6:
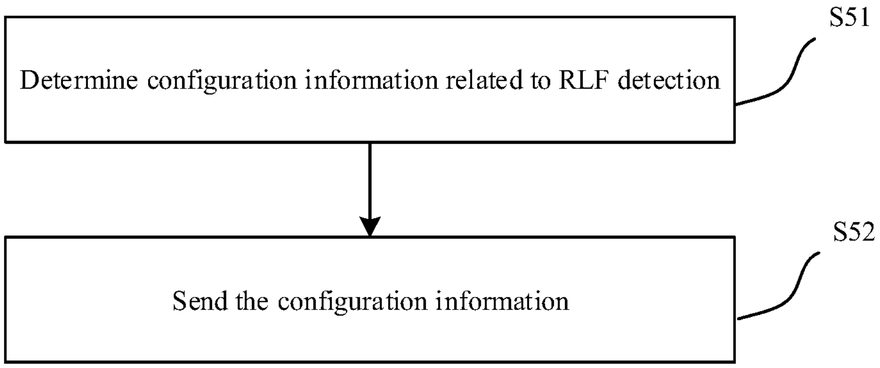
FIG. 6 is a flow diagram of an RLF detection method shown according to an example.

FIG. 6 is a flow diagram of an RLF detection method shown according to an example. As shown in FIG. 6, the RLF detection method is executed by a network side and includes the following steps.

In step S51, configuration information related to RLF detection is determined.

In step S52, the configuration information is sent.

In the example of the disclosure, the configuration information is used for the RLF detection.

In the example of the disclosure, signaling sent by a network device informs a terminal of the configuration information related to the RLF detection. The signaling may be a broadcast message, proprietary signaling or the like.

Through the RLF detection method provided by the example of the disclosure, a first timer duration for the RLF detection is determined according to a location of the terminal, so that an appropriate time may be determined based on the location of the terminal, and an RLF is detected within a time corresponding to the location of the terminal, which can reduce RRC reestablishment, or ensure that a network transmission environment can be recovered in time, so that the terminal can quickly recover a connection with a network or enter an idle state.

A selection condition included in the configuration information may be indicated by the network device or specified through a protocol, as mentioned above, which is not specifically limited here. It may be understood that if the selection condition is indicated to the terminal by the network device, the network device may dynamically indicate or reconfigure the selection condition according to the actual situation.

In an implementation, the selection condition for selecting a timer duration includes at least one of:

- a distance between the terminal and a satellite being greater than a seventh threshold;
- a triggering time;
- a hysteresis value;
- a distance between the terminal and a cell reference location being greater than an eighth threshold;
- the distance between the terminal and the cell reference location being less than a ninth threshold; or
- the distance between the terminal and the cell reference location being greater than the eighth threshold and a second timer being started.

In the example of the disclosure, the configuration information may further include ephemeris information of the satellite.

In an implementation, the network device sends the ephemeris information of the satellite to the terminal through an indication message.

The configuration information includes coverage information of a cell. As mentioned above, a relative location relationship between the terminal and the cell may be a distance between the terminal and a cell reference location. The distance between the terminal and the cell reference location may further be a distance between the terminal and a cell edge reference location, or a distance between the terminal and a cell center reference location.

The selection condition includes that a magnitude of an elevation angle between the terminal and the satellite is greater than or equal to an elevation angle threshold.

The selection condition includes that the magnitude of the elevation angle between the terminal and the satellite is greater than the elevation angle threshold.

In the example of the disclosure, the configuration information further includes a triggering time of the elevation angle.

It needs to be noted that the above implementations may be implemented separately or in any combination.

In the example of the disclosure, if the selection condition is met, the corresponding first timer duration is selected, and it is determined that RLF is detected when the first timer duration times out. Subsequent procedures such as RRC reestablishment are executed.

The selection condition may be used separately or in combination, which is not specifically limited here.

The configuration information includes the coverage information of the cell. As mentioned above, the relative location relationship between the terminal and the cell may be the distance between the terminal and the cell reference location. The distance between the terminal and the cell reference location may further be a distance between the terminal and a cell edge reference location, or a distance between the terminal and a cell center reference location.

In an implementation, the cell is a serving cell where the terminal performs communication based on the satellite.

In another implementation, the cell is a neighbor cell where the terminal performs communication based on the satellite.

In the example of the disclosure, a cell center reference location and a cell edge reference location may be acquired based on the cell coverage area.

In the example of the disclosure, cell coverage area information may be contained in the ephemeris information.

In an implementation, the selection condition includes that the distance between the terminal and the cell reference location is greater than an eighth threshold. The cell reference location is a cell center reference location.

In another implementation, the selection condition includes that the distance between the terminal and the cell reference location is greater than or equal to the eighth threshold. The cell reference location is a cell center reference location.

In another implementation, the selection condition includes that the distance between the terminal and the cell reference location is greater than the eighth threshold and a second timer is started. The second timer may be a timer T310.

In another implementation, the selection condition includes that the distance between the terminal and the cell reference location is greater than or equal to the eighth threshold and the second timer is started. The second timer may be a timer T310.

In another implementation, the selection condition may further include that the distance between the terminal and the cell reference location is less than a ninth threshold.

In another implementation, the selection condition may further include that the distance between the terminal and the cell reference location is less than or equal to the ninth threshold.

The selection condition further includes one or more of the triggering time and the hysteresis value.

Figure 7:
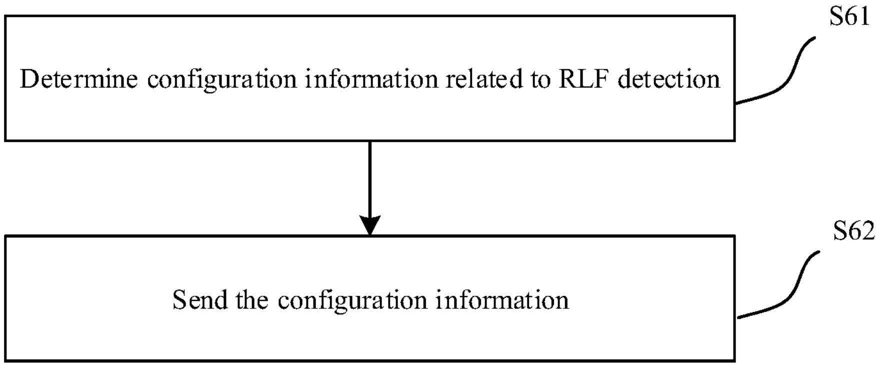
FIG. 7 is a flow diagram of an RLF detection method shown according to an example.

FIG. 7 is a flow diagram of an RLF detection method shown according to an example. As shown in FIG. 7, the RLF detection method is executed by a network side and includes the following steps.

In step S61, configuration information related to RLF detection is determined.

In step S62, the configuration information is sent.

In the example of the disclosure, the configuration information is used for the RLF detection. A network device sends the configured configuration information related to the RLF detection. The signaling may be a broadcast message, proprietary signaling or the like.

Through the RLF detection method provided by the example of the disclosure, a scaling factor for the RLF detection is selected according to a location of a terminal, so that an appropriate timer duration may be determined based on the location of the terminal, and an RLF can be detected within a time corresponding to the location of the terminal, which can reduce RRC reestablishment, or ensure that a network transmission environment can be recovered in time, so that the terminal can quickly recover a connection with a network or enter an idle state.

The configuration information sent by the network device includes a selection condition for selecting the corresponding scaling factor, and the selection condition for selecting the corresponding scaling factor may also be specified through a protocol, as mentioned above, which is not specifically limited here. It may be understood that if the selection condition is indicated to the terminal by the network device, the network device may dynamically indicate the selection condition according to the actual situation.

In an implementation, the selection condition for selecting the corresponding scaling factor includes at least one of:

a distance between the terminal and a satellite being greater than a tenth threshold;

a triggering time;

a hysteresis value;

a distance between the terminal and a cell reference location being greater than an eleventh threshold;

the distance between the terminal and the cell reference location being less than a twelfth threshold; or the distance between the terminal and the cell reference location being greater than the eleventh threshold and a second timer being started.

In the example of the disclosure, the configuration information includes one or more scaling factors and a corresponding selection condition for each scaling factor.

In the example of the disclosure, the configuration information may further include ephemeris information of the satellite.

In an implementation, the network device sends the ephemeris information of the satellite to the terminal through an indication message.

In an implementation, a starting condition includes that a magnitude of an elevation angle between the terminal and the satellite is greater than or equal to an elevation angle threshold.

In an implementation, the starting condition includes that the magnitude of the elevation angle between the terminal and the satellite is greater than the elevation angle threshold.

In an implementation, the configuration information further includes a triggering time of the elevation angle.

In an implementation, a selection condition is that the distance between the terminal and the satellite is greater than a tenth threshold.

In another implementation, the selection condition is that the distance between the terminal and the satellite is greater than or equal to the tenth threshold.

In the example of the disclosure, the configuration information may further include coverage information of a cell.

The configuration information includes the coverage information of the cell. As mentioned above, a relative location relationship between the terminal and the cell may be the distance between the terminal and the cell reference location. The distance between the terminal and the cell reference location may further be a distance between the terminal and a cell edge reference location, or a distance between the terminal and a cell center reference location.

In an implementation, the cell is a serving cell where the terminal performs communication based on the satellite.

In another implementation, the cell is a neighbor cell where the terminal performs communication based on the satellite.

In the example of the disclosure, a cell center reference location and a cell edge reference location may be acquired based on a cell coverage area.

In the example of the disclosure, cell coverage area information may be contained in the ephemeris information.

In an implementation, the selection condition includes that the distance between the terminal and the cell reference location is greater than an eleventh threshold. The cell reference location is a cell center reference location.

In another implementation, the selection condition includes that the distance between the terminal and the cell reference location is greater than or equal to the eleventh threshold. The cell reference location is the cell center reference location.

In another implementation, the selection condition includes that the distance between the terminal and the cell reference location is greater than the eleventh threshold and a second timer is started. The second timer may be a timer T310.

In another implementation, the selection condition includes that the distance between the terminal and the cell reference location is greater than or equal to the eleventh threshold and the second timer is started. The second timer may be a timer T310.

In another implementation, the selection condition may further include that the distance between the terminal and the cell reference location is less than a twelfth threshold.

In another implementation, the selection condition may further include that the distance between the terminal and the cell reference location is less than or equal to the twelfth threshold.

In the example of the disclosure, the triggering time and/or the hysteresis value may have different or the same value in different situations, which is not specifically limited here.

It needs to be noted that the above implementations may be implemented separately or in any combination.

In the example of the disclosure, if the selection condition is met, the corresponding first timer duration is selected, and it is determined that RLF is detected when the first timer duration times out. Subsequent procedures such as RRC reestablishment are executed.

It needs to be further noted that the method provided by the disclosure may further be used to introduce a new counter and its configuration information, and determine a counter for RLF detection based on counters such as a counter N310 and a counter N311. Alternatively, based on the method provided by the disclosure, the corresponding scaling factor is configured for the specified counter, the corresponding scaling factor is selected based on the selection condition of the scaling factor, and the counter for RLF detection is determined based on the corresponding scaling factor. Thus RRC reestablishment can be reduced, or a network transmission environment can be ensured to be recovered in time, so that the terminal can quickly recover the connection with the network or enter an idle state.

Based on the same concept, an example of the disclosure further provides an RLF detection apparatus.

It may be understood that, in order to implement the above functions, the RLF detection apparatus provided by the example of the disclosure contains corresponding hardware structures and/or software modules for executing all the functions. Combining with units and algorithm steps of each example disclosed in the example of the disclosure, the example of the disclosure can be implemented in a form of hardware or a combination of hardware and computer software. Whether a certain function is executed in a mode of hardware or a mode of the hardware driven by the computer software depends on a specific application and design constraint conditions of the technical solution. Those skilled in the art may use different methods to implement the described functions for each specific application, but such implementation needs not be regarded beyond the scope of the technical solution of the example of the disclosure.

Figure 8:
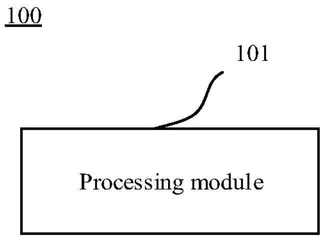
FIG. 8 is a block diagram of an RLF detection apparatus shown according to an example.

FIG. 8 is a block diagram of an RLF detection apparatus shown according to an example. Referring to FIG. 8, the apparatus 100 is executed by a terminal, and includes a processing module 101.

A processing module 101 is configured to determine configuration information related to RLF detection, and determine location information of a terminal. The processing module 101 is configured to start a first timer based on the configuration information and/or the location information of the terminal, the first timer being used for the RLF detection.

In the example of the disclosure, the processing module 101 is configured to start the first timer based on a starting condition included in the configuration information, as well as a relative location relationship between the terminal and a satellite; or, start the first timer based on the starting condition included in the configuration information, as well as a relative location relationship between the terminal and a cell.

In the example of the disclosure, the processing module 101 is configured to start the first timer based on information of a second timer included in the configuration information; or, start the first timer based on start time information of the first timer included in the configuration information.

In the example of the disclosure, the processing module 101 is configured to start, in response to determining that the configuration information includes a first value, the first timer upon receiving consecutive out-of-sync indications for the first value times.

In the example of the disclosure, the starting condition includes that a distance between the terminal and the satellite is greater than a first threshold.

The processing module 101 is configured to start the first timer in a case of determining that the distance between the terminal and the satellite is greater than the first threshold.

In the example of the disclosure, the starting condition includes one or more of a triggering time and a hysteresis value.

The processing module 101 is configured to determine to start the first timer based on at least one of the triggering time, the hysteresis value, or the relative location relationship between the terminal and the satellite.

In the example of the disclosure, the processing module 101 is configured to start the first timer in a case of determining that a distance between the terminal and a cell reference location is greater than a second threshold, where the starting condition is that the distance between the terminal and the cell reference location is greater than the second threshold; or, start the first timer in response to determining that the distance between the terminal and the cell reference location is less than a third threshold, where the starting condition is that the distance between the terminal and the cell reference location is less than the third threshold.

In the example of the disclosure, the processing module 101 is configured to start the first timer in response to determining that the distance between the terminal and the cell reference location is greater than the second threshold and a second timer is started, where the starting condition is that the distance between the terminal and the cell reference location is greater than the second threshold and the second timer is started.

In the example of the disclosure, the starting condition includes one or more of the triggering time and the hysteresis value.

The processing module 101 is configured to determine to start the first timer based on at least one of the triggering time, the hysteresis value, or the relative location relationship between the terminal and a cell.

In the example of the disclosure, configured start time information includes a start time threshold value.

The processing module 101 is configured to determine to start the first timer based on the start time threshold value.

In the example of the disclosure, the processing module 101 is further configured to determine that an RLF is detected when the first timer times out.

In the example of the disclosure, the processing module 101 is further configured to stop the first timer in response to determining that a stopping condition is met.

In the example of the disclosure, the processing module 101 is further configured to stop the first timer based on the configuration information and/or the location information of the terminal.

In the example of the disclosure, the processing module 101 is further configured to stop the first timer based on the stopping condition included in the configuration information, as well as the relative location relationship between the terminal and the satellite; or, stop the first timer based on the stopping condition included in the configuration information, as well as the relative location relationship between the terminal and the cell.

In the example of the disclosure, the processing module 101 is further configured to stop the first timer based on the information of the second timer included in the configuration information; or, stop the first timer based on stop time information of the first timer included in the configuration information.

In the example of the disclosure, the processing module 101 is further configured to stop, in response to determining that the configuration information includes a second value, the first timer upon receiving consecutive in-sync indications for the second value times.

In the example of the disclosure, the stopping condition includes that the distance between the terminal and the satellite is less than a fourth threshold.

The processing module 101 is further configured to stop the first timer in a case of determining that the distance between the terminal and the satellite is less than the fourth threshold.

In the example of the disclosure, the stopping condition includes one or more of a triggering time and a hysteresis value.

The processing module 101 is further configured to determine to stop the first timer based on at least one of the triggering time, the hysteresis value, or the relative location relationship between the terminal and the satellite.

In the example of the disclosure, the processing module 101 is further configured to stop the first timer in a case of determining that the distance between the terminal and the cell reference location is greater than a fifth threshold, where the stopping condition is that the distance between the terminal and the cell reference location is less than the fifth threshold; or, stop the first timer in response to determining that the distance between the terminal and the cell reference location is less than a sixth threshold, where the stopping condition is that the distance between the terminal and the cell reference location is greater than the sixth threshold.

In the example of the disclosure, the processing module 101 is further configured to stop the first timer in response to determining that the distance between the terminal and the cell reference location is greater than the fifth threshold and the second timer is started, where the stopping condition is that the distance between the terminal and the cell reference location is less than the fifth threshold and the second timer is started.

In the example of the disclosure, the stopping condition includes one or more of the triggering time and the hysteresis value.

The processing module 101 is further configured to determine to stop the first timer based on at least one of the triggering time, the hysteresis value, or the relative location relationship between the terminal and the cell.

In the example of the disclosure, configured stop time information includes a stop time threshold value.

The processing module 101 is further configured to determine to stop the first timer based on the stop time threshold value.

In the example of the disclosure, the processing module is configured to determine the configuration information related to the RLF detection, and determine the location information of the terminal. A selecting module is configured to select a first timer duration based on the configuration information and/or the location information of the terminal, the first timer duration being used for the RLF detection.

In the example of the disclosure, the configuration information includes a plurality of timer durations and a corresponding selection condition for each timer duration.

In the example of the disclosure, the processing module 101 is further configured to select the first timer duration based on the selection condition included in the configuration information, as well as the relative location relationship between the terminal and the satellite; or, select the first timer duration based on the selection condition included in the configuration information, as well as the relative location relationship between the terminal and the cell.

In the example of the disclosure, the processing module 101 is further configured to determine that the RLF is detected when the first timer duration times out.

In the example of the disclosure, the processing module 101 is further configured to determine the configuration information related to the RLF detection, and determine the location information of the terminal. An adjusting module is configured to adjust the first timer duration based on the configuration information and/or the location information of the terminal, the adjusted first timer duration being used for the RLF detection.

In the example of the disclosure, the configuration information includes one or more scaling factors and a corresponding selection condition for each scaling factor.

In the example of the disclosure, the processing module 101 is further configured to select the scaling factor based on the selection condition included in the configuration information, as well as the relative location relationship between the terminal and the satellite, and adjust the first timer duration based on the scaling factor; or, determine the scaling factor based on the selection condition included in the configuration information, as well as the relative location relationship between the terminal and the cell, and adjust the first timer duration based on the scaling factor.

In the example of the disclosure, the first timer duration is not adjusted in response to determining that the configured selection condition is not met.

In the example of the disclosure, the processing module 101 is further configured to determine that the RLF is detected when the adjusted first timer duration times out.

Figure 9:
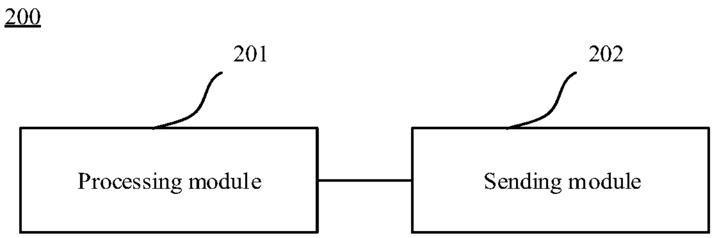
FIG. 9 is a block diagram of an RLF detection apparatus shown according to an example.

FIG. 9 is a block diagram of an RLF detection apparatus shown according to an example. Referring to FIG. 9, the apparatus 200 is executed by a network device, and includes a processing module 201 and a sending module 202.

The processing module 201 is configured to determine configuration information related to RLF detection. The sending module is configured to send the configuration information. The configuration information is used for the RLF detection.

In the example of the disclosure, the configuration information includes at least one of:

information of a second timer;

start time information of a first timer;

a first value, the first value being used for starting the first timer;

a starting condition, the starting condition being used for starting the first timer; or a stopping condition, the stopping condition being used for stopping the first timer.

In the example of the disclosure, the starting condition includes at least one of:

a distance between a terminal and a satellite being greater than a first threshold;

a triggering time;

a hysteresis value;

a distance between the terminal and a cell reference location being greater than a second threshold;

the distance between the terminal and the cell reference location being less than a third threshold; or the distance between the terminal and the cell reference location being greater than the second threshold and the second timer being started.

In the example of the disclosure, the stopping condition includes at least one of:

the distance between the terminal and the satellite being less than a fourth threshold;

the triggering time;

the hysteresis value;

the distance between the terminal and the cell reference location being less than a fifth threshold;

the distance between the terminal and the cell reference location being greater than a sixth threshold; or the distance between the terminal and the cell reference location being less than the fifth threshold and a second timer being started.

In the example of the disclosure, the apparatus further includes a selection condition for selecting a timer duration, and the selection condition includes at least one of:

the distance between the terminal and the satellite being greater than a seventh threshold;

the triggering time;

the hysteresis value;

the distance between the terminal and the cell reference location being greater than an eighth threshold;

the distance between the terminal and the cell reference location being less than a ninth threshold; or the distance between the terminal and the cell reference location being greater than the eighth threshold and a second timer being started.

In the example of the disclosure, the apparatus further includes a selection condition for selecting a scaling factor, and the selection condition includes at least one of:

the distance between the terminal and the satellite being greater than a tenth threshold;

the triggering time;

the hysteresis value;

the distance between the terminal and the cell reference location being greater than an eleventh threshold;

the distance between the terminal and the cell reference location being less than a twelfth threshold; or the distance between the terminal and the cell reference location being greater than the eleventh threshold and a second timer being started.

As for the apparatus in the above examples, the specific modes for executing operations by all the modules have been described in the examples related to the method in detail, which is not illustrated in detail here.

Figure 10:
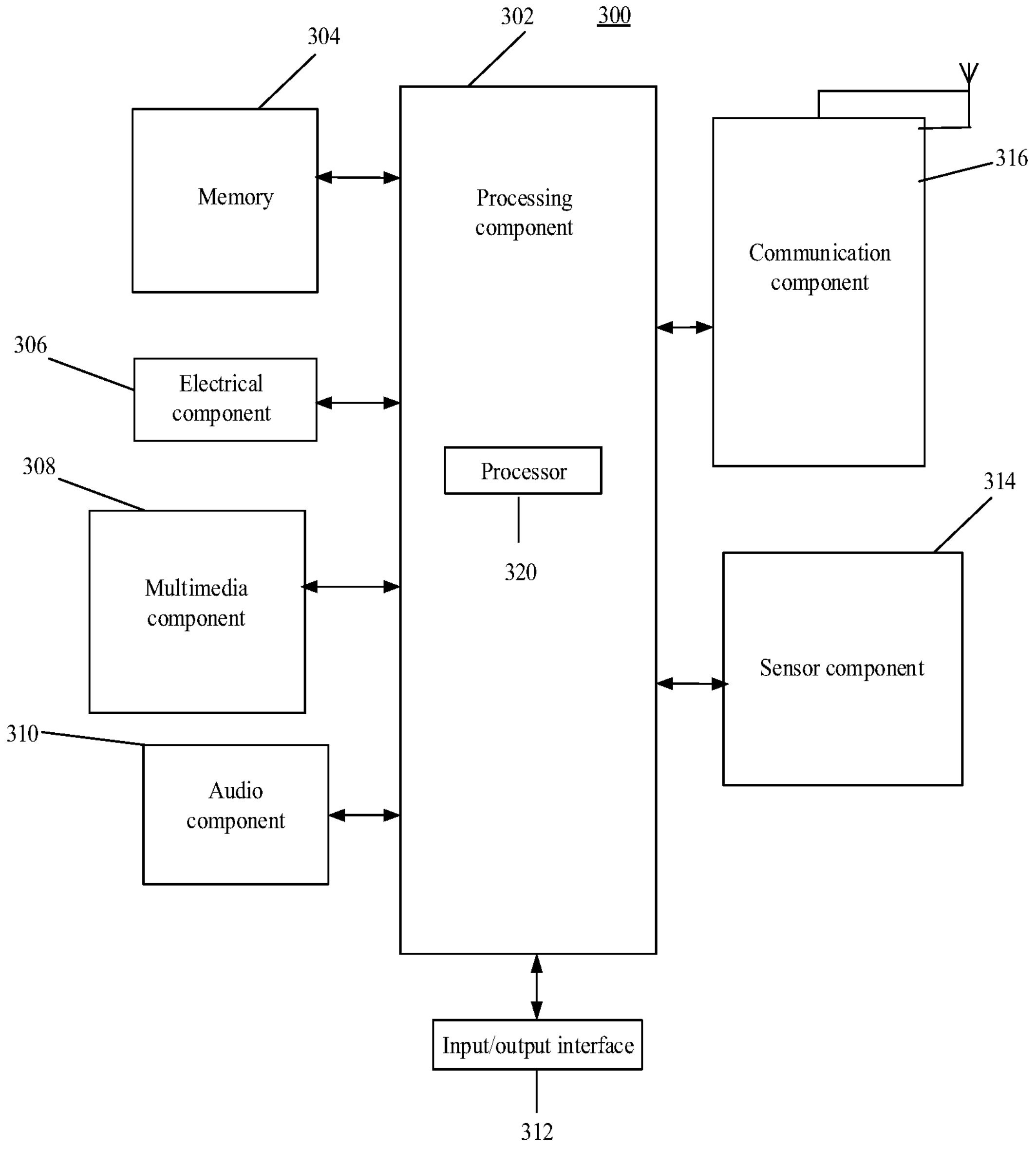
FIG. 10 is a block diagram of an apparatus for RLF detection shown according to an example.

FIG. 10 is a block diagram of an apparatus 300 for RLF detection shown according to an example. For example, the apparatus 300 may be a mobile telephone, a computer, a digital broadcast terminal, a message transceiving device, a game console, a tablet device, a medical device, a fitness device, a personal digital assistant, and the like.

Referring to FIG. 10, the apparatus 300 may include one or more of the following components: a processing component 302, a memory 304, an electrical component 306, a multimedia component 308, an audio component 310, an input/output (I/O) interface 312, a sensor component 314, and a communication component 316.

The processing component 302 usually controls an overall operation of the apparatus 300, such as operations associated with displaying, telephone calling, data communication, a camera operation and a record operation. The processing component 302 may include one or more processors 320 to execute an instruction, so as to complete all or part of steps of the above method. In addition, the processing component 302 may include one or more modules, so as to facilitate interaction between the processing component 302 and other components. For example, the processing component 302 may include a multimedia module, so as to facilitate interaction between the multimedia component 308 and the processing component 302.

The memory 304 is configured to store various types of data so as to support operations on the apparatus 300. Examples of these data include instructions of any application program or method used to be operated on the apparatus 300, contact data, telephone directory data, messages, pictures, videos, and the like. The memory 304 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 306 provides electric power for various components of the apparatus 300. The electrical component 306 may include a power management system, one or more power sources, and other components associated with generating, managing and distributing electric power for the apparatus 300.

The multimedia component 308 includes a screen providing an output interface between the apparatus 300 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some examples, the multimedia component 308 includes a front camera and/or a back camera. In response to determining that the apparatus 300 is in an operation mode, such as a shooting mode or a video mode, the front camera and/or the back camera may receive external multimedia data. Each front camera and each back camera may be a fixed optical lens system or have a focal length and optical zooming capability.

The audio component 310 is configured to output and/or input an audio signal. For example, the audio component 310 includes a microphone (MIC). In response to determining that the apparatus 300 is in an operation mode, such as a call mode, a recording mode or a voice recognition mode, the microphone is configured to receive an external audio signal. The received audio signal may be further stored in the memory 304 or sent via the communication component 316. In some examples, the audio component 310 further includes a speaker for outputting the audio signal.

The I/O interface 312 provides an interface between the processing component 302 and a peripheral interface module, and the above peripheral interface module may be a keyboard, a click wheel, buttons, etc. These buttons may include but are not limited to: a home button, a volume button, a start button and a lock button.

The sensor component 314 includes one or more sensors for providing state evaluations of all aspects for the apparatus 300. For example, the sensor component 314 may detect an on/off state of the apparatus 300 and relative positioning of components, for example, the components are a display and a keypad of the apparatus 300. The sensor component 314 may further detect location change of the apparatus 300 or one component of the apparatus 300, whether there is contact between the user and the apparatus 300, azimuth or speed up/speed down of the apparatus 300, and temperature change of the apparatus 300. The sensor component 314 may include a proximity sensor, which is configured to detect existence of a nearby object without any physical contact. The sensor component 314 may further include an optical sensor, such as a CMOS or CCD image sensor, for use in an imaging application. In some examples, the sensor component 314 may further include an acceleration sensor, a gyroscope sensor, a magnetic sensor, a pressure sensor or a temperature sensor.

The communication component 316 is configured to facilitate wired or wireless communication between the apparatus 300 and other devices. The apparatus 300 may access a wireless network based on a communication standard, such as WiFi, 2G or 3G, or their combination. In one example, the communication component 316 receives a broadcast signal or broadcast related information from an external broadcast management system via a broadcast channel. In one example, the communication component 316 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In an example, the apparatus 300 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

In an example, a non-temporary computer readable storage medium including instructions is further provided, such as a memory 304 including instructions. The above instructions may be executed by a processor 320 of the apparatus 300 so as to complete the above method. For example, the non-temporary computer readable storage medium may be an ROM, a random access memory (RAM), a CD-ROM, a magnetic tape, a floppy disk, an optical data storage device and the like.

Figure 11:
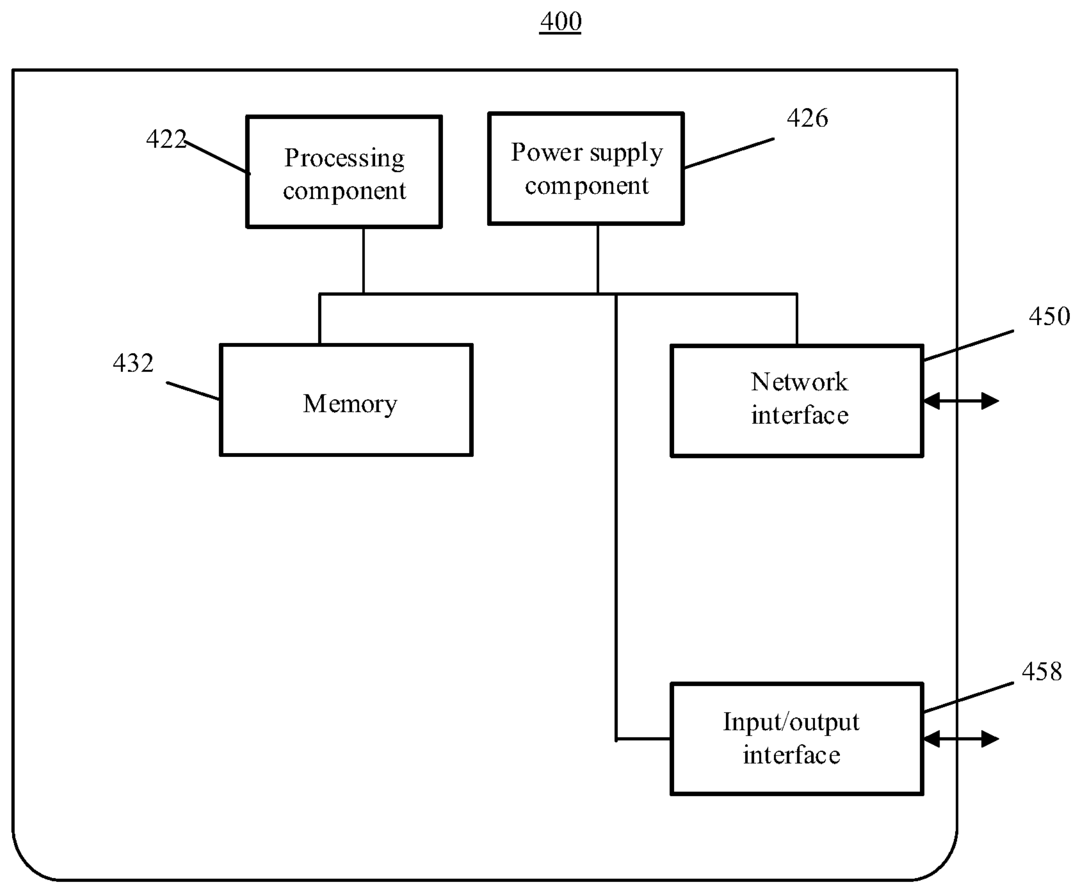
FIG. 11 is a block diagram of an apparatus for RLF detection shown according to an example.

FIG. 11 is a block diagram of an apparatus 400 for RLF detection shown according to an example. For example, the apparatus 400 may be provided as a server. Referring to FIG. 11, the apparatus 400 includes a processing component 422, which further includes one or more processors, and a memory resource represented by a memory 432, for storing instructions executable by the processing component 422, such as an application program. The application program stored in the memory 432 may include one or more modules with each corresponding to a set of instructions. In addition, the processing component 422 is configured to execute the instructions to execute the above method.

The apparatus 400 may further include a power supply component 426 configured to execute power management of the apparatus 400, a wired or wireless network interface 450 configured to connect the apparatus 400 to a network, and an input/output (I/O) interface 458. The apparatus 400 may operate based on an operating system stored in a memory 432, such as Windows Server™, Mac OS X™, Unix™, Linux™, FreeBSD™ or the like.

It may be further understood that in the disclosure, "plurality of" refers to two or more than two, and other quantifiers are similar. "And/or" describes an association relationship of an association object, and represents that there may be three kinds of relationships, for example, A and/or B, may represent: A exists alone, A and B exist at the same time, and B exists alone. A character "/" generally represents that the previous and next association objects are in an "or" relationship. The singular forms "a", "the" and "this" are intended to include the plural forms as well, unless the context clearly indicates otherwise.

It may be further understood that the terms "first", "second" and the like are used to describe various information, but these information needs not be limited to these terms. These terms are merely configured to distinguish the same type of information from one another, and do not imply a particular order or a level of importance. In fact, the expressions "first", "second" and the like may be used completely interchangeably. For example, in a case of not departing from the scope of the disclosure, first information may also be called second information, and similarly, the second information may also be called the first information.

It may be further understood that although in the examples of the disclosure, the operations are described in a specific order in the accompanying drawings, it needs not be construed as requiring that the operations are executed in the specific order shown or a serial order, or that all the operations shown are executed to obtain desired results. In a certain circumstance, multitasking and parallel processing may be advantageous.

Those of skill in the art will easily figure out other implementation solutions of the disclosure after considering the specification and practicing the disclosure. The present disclosure intends to cover any transformation, usage or adaptive change of the disclosure, and these transformations, usages or adaptive changes conform to a general principle of the disclosure and include common general knowledge or conventional technical means in the technical field not disclosed by the disclosure. The specification and the examples are merely regarded as being for example, and the true scope and spirit of the disclosure are indicated by the following claim scopes.

It needs to be understood that the disclosure is not limited to the exact structure that has been described above and shown in the accompanying drawings, and that various modifications and changes may be made without departing from the scope of the disclosure. The scope of the disclosure is limited merely by the appended claim scope.

The invention claimed is:

1. A radio link failure (RLF) detection method, executed by a terminal and comprising:

determining configuration information related to RLF detection, and determining location information of the terminal; and starting a first timer based on at least one of the configuration information or the location information of the terminal, the first timer being used for the RLF detection;

wherein starting the first timer based on the configuration information and the location information of the terminal comprises:

starting the first timer based on a starting condition comprised in the configuration information and a relative location relationship between the terminal and a satellite; or starting the first timer based on the starting condition comprised in the configuration information and a relative location relationship between the terminal and a cell;

wherein starting the first timer based on the starting condition comprised in the configuration information and the relative location relationship between the terminal and the satellite comprises:

starting the first timer in response to determining that a distance between the terminal and the satellite is greater than a first threshold, wherein the starting condition comprises that the distance between the terminal and the satellite is greater than the first threshold; or determining to start the first timer based on at least one of a triggering time, a hysteresis value, or the relative location relationship between the terminal and the satellite, wherein the starting condition comprises at least one of the triggering time or the hysteresis value;

wherein starting the first timer based on the starting condition comprised in the configuration information and the relative location relationship between the terminal and the cell comprises:

starting the first timer in response to determining that a distance between the terminal and a cell reference location is greater than a second threshold, wherein the starting condition is that the distance between the terminal and the cell reference location is greater than the second threshold;

starting the first timer in response to determining that the distance between the terminal and the cell reference location is less than a third threshold, wherein the starting condition is that the distance between the terminal and the cell reference location is less than the third threshold;

starting the first timer in response to determining that a distance between the terminal and the cell reference location is greater than a second threshold and a second timer is started, wherein the starting condition is that the distance between the terminal and the cell reference location is greater than the second threshold and the second timer is started; or determining to start the first timer based on at least one of the triggering time, the hysteresis value, or the relative location relationship between the terminal and the cell, wherein the starting condition comprises at least one of the triggering time or the hysteresis value.

2. The RLF detection method according to claim 1, wherein starting the first timer based on the configuration information comprises:

starting the first timer based on information of a second timer comprised in the configuration information; or starting the first timer based on start time information of the first timer comprised in the configuration information.

3. The RLF detection method according to claim 2, wherein the start time information comprises a start time threshold value.

4. The RLF detection method according to claim 1, wherein starting the first timer based on the configuration information comprises:

starting, in response to determining that the configuration information comprises a first value, the first timer upon receiving consecutive out-of-sync indications for the first value times.

5. The RLF detection method according to claim 1, further comprising:

determining timeout of the first timer; and determining that the RLF is detected.

6. The RLF detection method according to claim 1, further comprising:

stopping the first timer in response to determining that a stopping condition is met.

7. A non-transitory computer-readable storage medium, used for storing instructions, wherein the instructions, when executed, cause the method according to claim 1 to be implemented.

8. A radio link failure (RLF) detection method, executed by a network device and comprising:

determining configuration information related to RLF detection; and sending the configuration information, the configuration information being used for a terminal to start a first timer based on at least one of the configuration information or location information of the terminal, the first timer being used for the RLF detection;

wherein starting the first timer based on the configuration information and the location information of the terminal comprises:

starting the first timer based on a starting condition comprised in the configuration information and a relative location relationship between the terminal and a satellite; or starting the first timer based on the starting condition comprised in the configuration information and a relative location relationship between the terminal and a cell;

wherein starting the first timer based on the starting condition comprised in the configuration information and the relative location relationship between the terminal and the satellite comprises:

starting the first timer in response to determining that a distance between the terminal and the satellite is greater than a first threshold, wherein the starting condition comprises that the distance between the terminal and the satellite is greater than the first threshold; or determining to start the first timer based on at least one of a triggering time, a hysteresis value, or the relative location relationship between the terminal and the satellite, wherein the starting condition comprises at least one of the triggering time or the hysteresis value;

wherein starting the first timer based on the starting condition comprised in the configuration information and the relative location relationship between the terminal and the cell comprises:

starting the first timer in response to determining that a distance between the terminal and a cell reference location is greater than a second threshold, wherein the starting condition is that the distance between the terminal and the cell reference location is greater than the second threshold;

starting the first timer in response to determining that the distance between the terminal and the cell reference location is less than a third threshold, wherein the starting condition is that the distance between the terminal and the cell reference location is less than the third threshold;

starting the first timer in response to determining that a distance between the terminal and the cell reference location is greater than a second threshold and a second timer is started, wherein the starting condition is that the distance between the terminal and the cell reference location is greater than the second threshold and the second timer is started; or determining to start the first timer based on at least one of the triggering time, the hysteresis value, or the relative location relationship between the terminal and the cell, wherein the starting condition comprises at least one of the triggering time or the hysteresis value.

9. The RLF detection method according to claim 8, wherein the configuration information comprises at least one of:

information of a second timer;

start time information of a first timer;

a first value, the first value being used for starting the first timer;

a starting condition, the starting condition being used for starting the first timer; or a stopping condition, the stopping condition being used for stopping the first timer.

10. The RLF detection method according to claim 9, wherein the starting condition comprises at least one of:

a distance between a terminal and a satellite being greater than a first threshold;

a triggering time;

a hysteresis value;

a distance between the terminal and a cell reference location being greater than a second threshold;

the distance between the terminal and the cell reference location being less than a third threshold; or the distance between the terminal and the cell reference location being greater than the second threshold and the second timer being started.

11. A non-transitory computer-readable storage medium, used for storing instructions, wherein the instructions, when executed, cause the method according to claim 8 to be implemented.

12. A Radio Link Failure (RLF) detection apparatus, comprising:

a processor; and a memory, configured to store instructions executable by the processor, wherein the processor is configured to:

determine configuration information related to RLF detection, and determine location information of the terminal; and start a first timer based on at least one of the configuration information or the location information of the terminal, the first timer being used for the RLF detection;

wherein the processor is further configured to:

start the first timer based on a starting condition comprised in the configuration information and a relative location relationship between the terminal and a satellite; or start the first timer based on the starting condition comprised in the configuration information and a relative location relationship between the terminal and a cell;

wherein starting the first timer based on the starting condition comprised in the configuration information and the relative location relationship between the terminal and the satellite comprises:

starting the first timer in response to determining that a distance between the terminal and the satellite is greater than a first threshold, wherein the starting condition comprises that the distance between the terminal and the satellite is greater than the first threshold; or determining to start the first timer based on at least one of a triggering time, a hysteresis value, or the relative location relationship between the terminal and the satellite, wherein the starting condition comprises at least one of the triggering time or the hysteresis value;

wherein starting the first timer based on the starting condition comprised in the configuration information and the relative location relationship between the terminal and the cell comprises:

starting the first timer in response to determining that a distance between the terminal and a cell reference location is greater than a second threshold, wherein the starting condition is that the distance between the terminal and the cell reference location is greater than the second threshold;

starting the first timer in response to determining that the distance between the terminal and the cell reference location is less than a third threshold, wherein the starting condition is that the distance between the terminal and the cell reference location is less than the third threshold;

starting the first timer in response to determining that a distance between the terminal and the cell reference location is greater than a second threshold and a second timer is started, wherein the starting condition is that the distance between the terminal and the cell reference location is greater than the second threshold and the second timer is started; or determining to start the first timer based on at least one of the triggering time, the hysteresis value, or the relative location relationship between the terminal and the cell, wherein the starting condition comprises at least one of the triggering time or the hysteresis value.

* * * * *